(12) United States Patent
Tong et al.

(10) Patent No.: US 10,713,955 B2
(45) Date of Patent: Jul. 14, 2020

(54) METHOD AND SYSTEM FOR PROVIDING ARTIFICIAL INTELLIGENCE ANALYTIC (AIA) SERVICES FOR PERFORMANCE PREDICTION

(71) Applicant: Xevo Inc., Bellevue, WA (US)

(72) Inventors: Richard Chia Tsing Tong, Seattle, WA (US); Robert Victor Welland, Seattle, WA (US); John Hayes Ludwig, Bellevue, WA (US); John Palmer Cordell, Los Angeles, CA (US); Samuel James McKelvie, Seattle, WA (US)

(73) Assignee: XEVO INC., Bellevue, WA (US)

( * ) Notice: Subject to any disclaimer, the term of this patent is extended or adjusted under 35 U.S.C. 154(b) by 154 days.

(21) Appl. No.: 15/852,567

(22) Filed: Dec. 22, 2017

(65) Prior Publication Data

US 2018/0182187 A1    Jun. 28, 2018

Related U.S. Application Data

(60) Provisional application No. 62/438,268, filed on Dec. 22, 2016.

(51) Int. Cl.
*G08G 1/16*    (2006.01)
*G06N 20/00*    (2019.01)
(Continued)

(52) U.S. Cl.
CPC ......... *G08G 1/168* (2013.01); *B60R 16/0231* (2013.01); *G06K 9/00791* (2013.01);
(Continued)

(58) Field of Classification Search
CPC .................................................. G08G 1/168
See application file for complete search history.

(56) References Cited

U.S. PATENT DOCUMENTS 5,170,352 A    12/1992   McTamaney et al.
5,465,079 A    11/1995   Bouchard et al.
(Continued)

FOREIGN PATENT DOCUMENTS

JP    2009146086 A    7/2009
JP    2016057959 A    4/2016
(Continued)

OTHER PUBLICATIONS

Non-Final Office Action dated Jul. 3, 2019 for U.S. Appl. No. 15/672,747, filed Aug. 8, 2017, First Named Inventor: John Palmer Cordell.
(Continued)

*Primary Examiner* — Calvin Cheung
(74) *Attorney, Agent, or Firm* — Seed IP Law Group LLP

(57) ABSTRACT

One embodiment of the present invention predicts a vehicular event relating to machinal performance using information obtained from interior and exterior sensors, vehicle onboard computer ("VOC"), and cloud data. The process of predication is able to activate interior and exterior sensors mounted on a vehicle operated by a driver for obtaining current data relating to external surroundings, interior settings, and internal mechanical conditions of the vehicle. After forwarding the current data to VOC to generate a current vehicle status representing real-time vehicle performance in accordance with the current data, retrieving a historical data associated with the vehicle including mechanical condition is retrieved. In one aspect, a normal condition signal is issued when the current vehicle status does not satisfy with the optimal condition based on the historical data. Alternatively, a race car condition is issued when the current vehicle status meets with the optimal condition.

14 Claims, 18 Drawing Sheets

(51) Int. Cl.
G06K 9/00 (2006.01)
G06K 9/62 (2006.01)
G06Q 10/00 (2012.01)
G07C 5/00 (2006.01)
B60R 16/023 (2006.01)
G06N 5/02 (2006.01)
G06N 7/00 (2006.01)
G06Q 30/00 (2012.01)
G07C 5/08 (2006.01)
G07C 5/10 (2006.01)
H04L 12/40 (2006.01)
H04N 7/18 (2006.01)
G08G 1/14 (2006.01)
G06N 5/04 (2006.01)
G06Q 40/08 (2012.01)

(52) U.S. Cl.
CPC ....... G06K 9/00845 (2013.01); G06K 9/6288 (2013.01); G06N 5/022 (2013.01); G06N 7/005 (2013.01); G06N 20/00 (2019.01); G06Q 10/20 (2013.01); G06Q 30/014 (2013.01); G07C 5/006 (2013.01); G07C 5/008 (2013.01); G07C 5/0808 (2013.01); G07C 5/0841 (2013.01); G07C 5/10 (2013.01); G08G 1/143 (2013.01); H04L 12/40 (2013.01); H04N 7/181 (2013.01); B60Y 2400/3015 (2013.01); G06K 9/00812 (2013.01); G06N 5/04 (2013.01); G06Q 40/08 (2013.01); H04L 2012/40215 (2013.01)

(56) References Cited

U.S. PATENT DOCUMENTS

| | | | |
|---|---|---|---|
| 5,910,782 A | 6/1999 | Schmitt et al. | |
| 5,983,154 A * | 11/1999 | Morisawa | F16H 59/66 701/533 |
| 7,119,832 B2 | 10/2006 | Blanco et al. | |
| 7,389,178 B2 | 6/2008 | Raz et al. | |
| 8,514,825 B1 * | 8/2013 | Addepalli | H04W 72/0406 370/338 |
| 8,593,301 B2 | 11/2013 | Newman | |
| 8,630,768 B2 * | 1/2014 | McClellan | G01S 5/0027 701/36 |
| 8,903,591 B1 | 12/2014 | Ferguson et al. | |
| 8,903,593 B1 | 12/2014 | Addepalli et al. | |
| 9,288,270 B1 * | 3/2016 | Penilla | H04L 67/306 |
| 9,373,203 B1 * | 6/2016 | Fields | G07C 5/12 |
| 9,428,052 B1 | 8/2016 | Raz | |
| 9,520,006 B1 * | 12/2016 | Sankovsky | G07C 5/006 |
| 9,601,018 B2 | 3/2017 | Cogill et al. | |
| 2005/0203684 A1 * | 9/2005 | Borgesson | B60K 35/00 701/36 |
| 2005/0280555 A1 | 12/2005 | Warner | |
| 2006/0038818 A1 | 2/2006 | Steele | |
| 2006/0250278 A1 | 11/2006 | Tillotson et al. | |
| 2006/0267799 A1 | 11/2006 | Mendelson | |
| 2007/0005404 A1 | 1/2007 | Raz et al. | |
| 2007/0040701 A1 | 2/2007 | Browne et al. | |
| 2008/0186210 A1 | 8/2008 | Tseng | |
| 2008/0211652 A1 * | 9/2008 | Cope | B60K 35/00 340/461 |
| 2008/0255722 A1 | 10/2008 | McClellan et al. | |
| 2010/0185390 A1 | 7/2010 | Monde et al. | |
| 2010/0238009 A1 | 9/2010 | Cook et al. | |
| 2010/0250021 A1 | 9/2010 | Cook et al. | |
| 2011/0307130 A1 * | 12/2011 | Gow | B60G 17/0195 701/22 |
| 2011/0313593 A1 * | 12/2011 | Cohen | G01S 5/0027 701/2 |
| 2012/0092190 A1 | 4/2012 | Stefik et al. | |
| 2012/0221216 A1 | 8/2012 | Chauncey et al. | |
| 2012/0290215 A1 | 11/2012 | Adler et al. | |
| 2013/0024060 A1 | 1/2013 | Sukkarie et al. | |
| 2013/0057686 A1 | 3/2013 | Genc et al. | |
| 2013/0151288 A1 | 6/2013 | Bowne et al. | |
| 2013/0246181 A1 | 9/2013 | Lobsenz | |
| 2014/0078282 A1 | 3/2014 | Aoki et al. | |
| 2014/0111647 A1 | 4/2014 | Atsmon et al. | |
| 2014/0223284 A1 | 8/2014 | Rankin, Jr. et al. | |
| 2014/0244150 A1 | 8/2014 | Boesch et al. | |
| 2014/0276090 A1 | 9/2014 | Breed | |
| 2014/0309866 A1 * | 10/2014 | Ricci | H04W 4/40 701/36 |
| 2015/0073664 A1 | 3/2015 | Petridis et al. | |
| 2015/0092056 A1 | 4/2015 | Rau et al. | |
| 2015/0100504 A1 | 4/2015 | Binion et al. | |
| 2015/0138001 A1 | 5/2015 | Davies et al. | |
| 2015/0213555 A1 * | 7/2015 | Barfield, Jr. | G06Q 40/08 705/4 |
| 2015/0294422 A1 | 10/2015 | Carver et al. | |
| 2015/0294567 A1 | 10/2015 | De La Plaza Ortega | |
| 2015/0317844 A1 | 11/2015 | Choi et al. | |
| 2015/0336586 A1 * | 11/2015 | Choi | B60R 16/0236 340/425.5 |
| 2016/0035150 A1 * | 2/2016 | Barfield, Jr. | G07C 5/008 701/29.3 |
| 2016/0042650 A1 | 2/2016 | Stenneth | |
| 2016/0055749 A1 | 2/2016 | Nicoll et al. | |
| 2016/0065903 A1 | 3/2016 | Wang et al. | |
| 2016/0104486 A1 | 4/2016 | Penilla et al. | |
| 2016/0117866 A1 | 4/2016 | Stancato et al. | |
| 2016/0307056 A1 | 10/2016 | Schiek et al. | |
| 2017/0017927 A1 | 1/2017 | Domnick et al. | |
| 2017/0046955 A1 | 2/2017 | Shen | |
| 2017/0057492 A1 | 3/2017 | Edgington et al. | |
| 2017/0072850 A1 | 3/2017 | Curtis et al. | |
| 2017/0200061 A1 | 7/2017 | Julian et al. | |
| 2017/0294139 A1 | 10/2017 | Cordova et al. | |
| 2017/0308802 A1 * | 10/2017 | Ramsoy | H04L 63/0421 |
| 2017/0357864 A1 | 12/2017 | Welland et al. | |
| 2018/0033307 A1 | 2/2018 | Tayama et al. | |
| 2018/0050699 A1 * | 2/2018 | Gauthier | B60W 30/18009 |
| 2018/0053108 A1 * | 2/2018 | Olabiyi | G06N 3/084 |
| 2018/0283537 A1 * | 10/2018 | Kawashiri | F16H 61/16 |

FOREIGN PATENT DOCUMENTS

| | | |
|---|---|---|
| KR | 10-2011-0105124 A | 9/2011 |
| KR | 10-2014-0002373 A | 1/2014 |
| KR | 1020150137264 A | 12/2015 |
| KR | 10-2016-0139624 A | 12/2016 |
| WO | 2013005912 A1 | 1/2013 |

OTHER PUBLICATIONS

International Search Report for PCT/US2017/046122, dated Aug. 9, 2017, Korean Intellectual Property Office, Republic of Korea.

U.S. Appl. No. 15/672,747, filed Aug. 9, 2017, "Method and Apparatus for Providing Information via Collected and Stored Metadata using Inferred Attentional Model," first named inventor: John Palmer Cordell.

International Search Report, dated May 24, 2018, Korean Intellectual Property Office, Republic of Korea.

Final Office Action dated Dec. 23, 2019 for U.S. Appl. No. 15/672,747, filed Aug. 9, 2017, Titled: Method and Apparatus for Providing Informaton via Collected and Stored Metadata Using Inferred Attentional Model, First named inventor : John Cordell.

Anup Doshi, Investigating the Relationships Between Gaze Patterns, Dynamic Vehicle Surround Analysis, and Driver Intentions, IEEE, pp. 887-892, 2009.

* cited by examiner

METHOD AND SYSTEM FOR PROVIDING ARTIFICIAL INTELLIGENCE ANALYTIC (AIA) SERVICES FOR PERFORMANCE PREDICTION

PRIORITY

This application claims the benefit of priority based upon U.S. Provisional Patent Application having an application Ser. No. 62/438,268, filed on Dec. 22, 2016, and having a title of "Method and System for Providing Artificial Intelligence (AI) Analytic Services Using Cloud and Embedded Data," which is hereby incorporated by reference in its entirety.

RELATED APPLICATION

This application is related to the following co-pending application assigned to the Assignee of the present invention.

a. application Ser. No. 15/852,346, filed Dec. 22, 2017, entitled "Method and Apparatus for Providing Artificial Intelligence Analytic (AIA) Services Using Operator Fingerprints and Cloud Data," invented by the same inventors; and b. application Ser. No. 15/853,593, filed Dec. 22, 2017, entitled "Method and Apparatus for Providing Interactive Parking Management via Artificial Intelligence Analytic (AIA) Services using Cloud Network," invented by the same inventors.

FIELD

The exemplary embodiment(s) of the present invention relates to the field of communication networks. More specifically, the exemplary embodiment(s) of the present invention relates to providing automation relating to vehicles using artificial intelligence ("AI") modules and cloud computing.

BACKGROUND

With rapid integration of motor vehicle with wireless network, AI, and IoT (Internet of Things), the demand of intelligent machine and instant response is constantly growing. For example, the cars or vehicles which become smarter can assist drivers to operate the vehicles. To implement the integration of vehicle and AI, some technical pieces, such as data management, model training, and data collection, need to be improved. The conventional machine learning process, for example, is generally an exploratory process which may involve trying different kinds of models, such as convolutional, RNN (recurrent neural network), attentional, et cetera.

Machine learning or model training typically concerns a wide variety of hyper-parameters that change the shape of the model and training characteristics. Model training generally requires intensive computation and data collection. With conventional data collection via IoT, AI, real-time images, videos, and/or machine learning, the size of data (real-time data, cloud data, big data, etc.) is voluminous and becomes difficult to handle and digest. As such, real-time response via machine learning model with massive data processing can be challenging. Another drawback associated with large data processing and machine learning for model improvements is that it is often difficult to translate collected data into useful information.

SUMMARY

One embodiment of the present invention discloses an artificial intelligence analytic ("AIA") process of providing a prediction or report capable of predicting an event relating to vehicle performance using data obtained from interior and exterior sensors, vehicle onboard computer ("VOC"), and cloud computing. The process activates the interior and exterior sensors mounted on a vehicle operated by a driver for obtaining current data relating to external surroundings, interior settings, and internal mechanical conditions of the vehicle. For example, after enabling a set of outward facing cameras mounted on the vehicle for recording external surrounding images representing a geographic environment, one or more inward facing cameras mounted in the vehicle is initiated for collecting interior images of the vehicle. Also, a set of internal sensors attached to various mechanical components is activated for measuring temperatures, functionalities, or audio sounds associated with mechanical components within the vehicle. The process, in one embodiment, is capable of detecting driver's response time based on a set of identified road conditions and information from a controller area network ("CAN") bus of the vehicle. The real-time data relating to vehicle performance, road condition, traffic congestion, and weather condition is recorded. The current data is forwarded to VOC for generating a current vehicle status representing substantially real-time vehicle performance in accordance with the current data. The historical data associated with the vehicle including mechanical condition is retrieved. Note that the historical data is updated in response to the current data.

A normal condition signal is issued when the current vehicle status does not satisfy with optimal condition based on the historical data. In one aspect, after uploading the current vehicle status to a vehicle performance predictor which resides at least partially at a cloud via a communications network, the big data is obtained from the cloud wherein the big data represents large car samples having similar attributes as the vehicle. For example, the big data accumulates information from cars with similar brands, similar mileages, similar years, similar geographic location, and similar drivers. The current vehicle status is compared with the big data and the historical data to assess whether the vehicle operates in a normal condition. The "race car ready" condition is issued when the current vehicle status meets with the optimal condition based on the historical data. In one example, the current vehicle status is forwarded to a subscriber for evaluating driver's driving skill. The current vehicle status can also be forwarded to a subscriber for assessing normal wearing and tearing. Alternatively, a subscriber schedules a maintenance or repair appointment with the driver based on the current vehicle status. In one embodiment, a manufacture can initiate a recall for automobiles similar to the vehicle at least partially based on the current vehicle status.

An AIA system capable of providing a vehicle performance prediction relating to an automobile operated by a driver includes sensors, VOC, and cloud network. In one aspect, a group of interior and exterior sensors mounted on a vehicle and internal mechanical components are configured to collect information relating to external surroundings, interior environment, and components conditions. For example, the interior and exterior sensors include outward facing cameras mounted on a vehicle collecting external images representing a surrounding environment in which the vehicle operates and inward facing cameras mounted inside of the vehicle collecting interior images including operator facial expression and operator's attention.

VOC is used to generate a current vehicle status which represents a current vehicle condition in accordance with the obtained information. The cloud network, in one embodiment, includes a normal condition module, prediction module, and race car module. The normal condition module determines a normal condition for the vehicle based on the current vehicle status, historical vehicle status, and big data, wherein the big data represents a large sample having similar attributes as the vehicle. The prediction module is capable of predicting vehicle failure in response to the normal condition. The race car module is able to provide skills and/or mistakes associated with a race car driver operating the vehicle based on the current vehicle status, historical vehicle status, and big data which is a large set of accumulated samples having similar characteristics as the vehicle. It should be noted that the cloud network also includes a subscription module for facilitating and enlisting subscribers.

In an alternative embodiment, an AIA system or process able to accumulate information relating to machinal performance and drivers in accordance with information obtained from interior and exterior sensors, VOC, and cloud network is capable of activating interior and exterior sensors mounted inside and outside of a vehicle operated by a driver for collecting real-time information relating to external surroundings, interior settings, and internal conditions of the vehicle. After forwarding the real-time information to the VOC to generate a current vehicle status representing substantial real-time vehicle performance in accordance with the real-time information, the current vehicle status is uploaded to the cloud network and retrieving a historical data associated with the vehicle including performance data. Upon generating a vehicle performance report in response to the historical data and big data containing relatively large samples having similar attributes as the vehicle, a maintenance appointment is scheduled by a repair shop with the driver based on the vehicle performance report. The vehicle performance report can also be forwarded to a subscribed automobile manufacturer for vehicle recalls. Moreover, the vehicle performance report can also be sent to a subscriber owner of the vehicle indicating current mechanical condition of the vehicle.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1A:
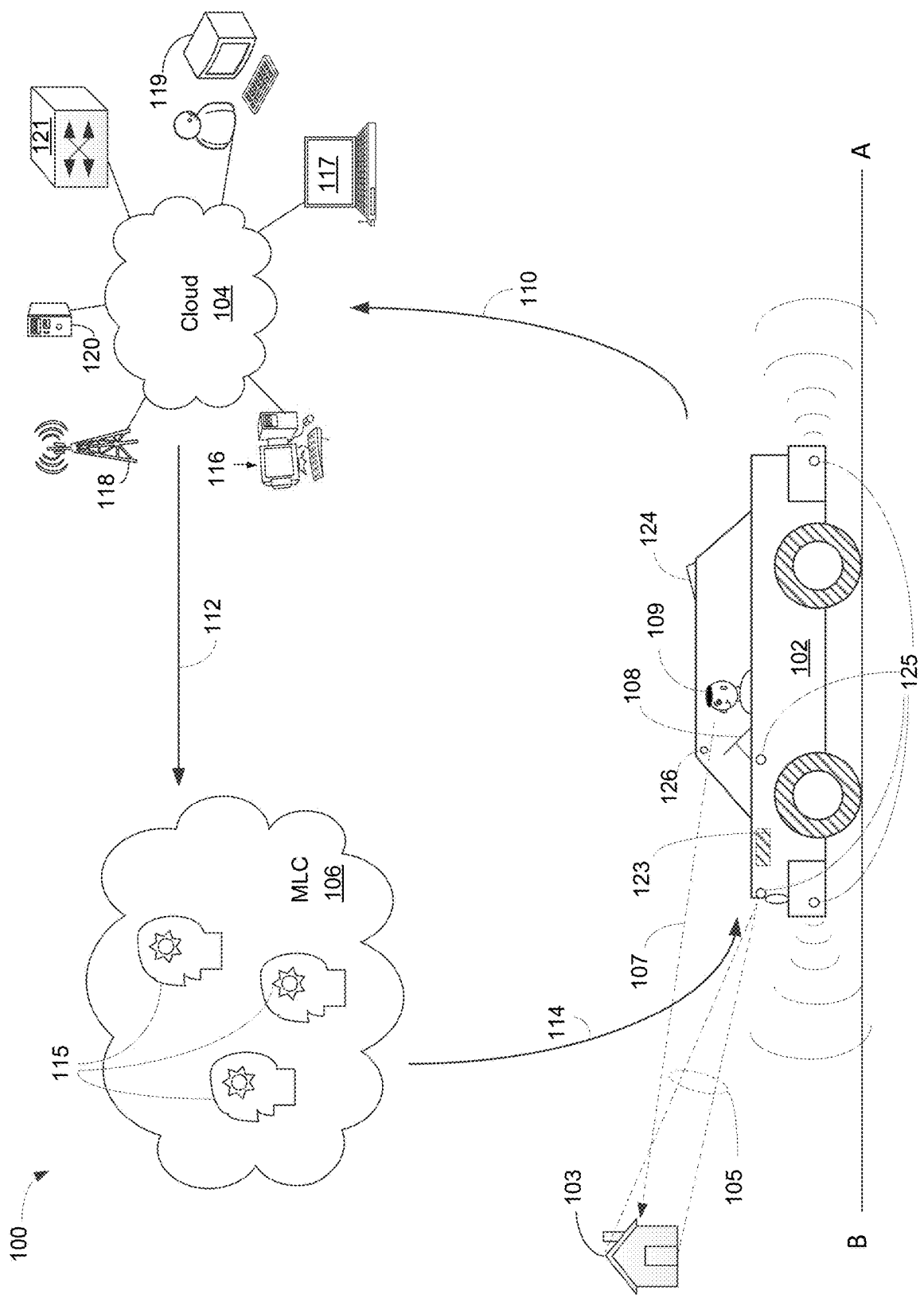
FIGS. 1A-1B are block diagrams illustrating artificial intelligence analytic service ("AIAS") capable of predicting vehicle mechanical performance ("VMP") using a virtuous cycle in accordance with one embodiment of the present invention.

Embodiments of the present invention are described herein with context of a method and/or apparatus for providing prediction services using cloud data, embedded data, and machine learning center ("MLC").

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

In accordance with the embodiment(s) of present invention, the components, process steps, and/or data structures described herein may be implemented using various types of operating systems, computing platforms, computer programs, and/or general-purpose machine. In addition, those of ordinary skills in the art will recognize that devices of less general-purpose nature, such as hardware devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

The term "system" or "device" is used generically herein to describe any number of components, elements, subsystems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

One embodiment of the present invention predicts a vehicular event relating to machinal performance using information obtained from interior and exterior sensors, vehicle onboard computer ("VOC"), and cloud data. The process of predication is able to activate interior and exterior sensors mounted on a vehicle operated by a driver for obtaining current data relating to external surroundings, interior settings, and internal mechanical conditions of the vehicle. After forwarding the current data to VOC to generate a current vehicle status representing real-time vehicle performance in accordance with the current data, retrieving a historical data associated with the vehicle including mechanical condition is retrieved. In one aspect, a normal condition signal is issued when the current vehicle status does not satisfy with the optimal condition based on the historical data. Alternatively, a race car condition is issued when the current vehicle status meets with the optimal condition.

FIG. 1A is a block diagram 100 illustrating artificial intelligence analytic service ("AIAS") capable of predicting vehicle mechanical performance ("VMP") using a virtuous cycle in accordance with one embodiment of the present invention. Diagram 100 illustrates a virtuous cycle containing a vehicle 102, cloud based network ("CBN") 104, and machine learning center ("MLC") 106. In one aspect, MCL 106 can be located remotely or in the cloud. Alternatively, MCL 106 can be a part of CBN 104. It should be noted that the underlying concept of the exemplary embodiment(s) of the present invention would not change if one or more blocks (circuit or elements) were added to or removed from diagram 100.

Vehicle 102, in one example, can be a car, automobile, bus, train, drone, airplane, truck, and the like, and is capable of moving geographically from point A to point B. To simplify forgoing discussing, the term "vehicle" or "car" is used to refer to car, automobile, bus, train, drone, airplane, truck, motorcycle, and the like. Vehicle 102 includes wheels with ABS (anti-lock braking system), auto body, steering wheel 108, exterior or outward facing cameras 125, interior (or 360° (degree)) or inward facing camera(s) 126, antenna 124, onboard controller or VOC 123, and operator (or driver) 109. It should be noted that outward facing cameras and/or inward facing cameras 125-126 can be installed at front, side, top, back, and/or inside of vehicle 102. In one example, vehicle 102 also includes various sensors which senses mechanical related data associated with the vehicle, vehicle status, and/or driver actions. For example, the sensors, not shown in FIG. 1A, can also collect other relevant information, such as audio, ABS, steering, braking, acceleration, traction control, windshield wipers, GPS (global positioning system), radar, sonar, ultrasound, lidar (Light Detection and Ranging), and the like.

VOC or onboard controller 123 includes CPU (central processing unit), GPU (graphic processing unit), memory, and disk responsible for gathering data from outward facing or exterior cameras 125, inward facing or interior cameras 126, audio sensor, ABS, traction control, steering wheel, CAN-bus sensors, and the like. In one aspect, VOC 123 executes IA model received from MLC 106, and uses antenna 124 to communicate with CBN 104 via a wireless communication network 110. Note that wireless communication network includes, but not limited to, WIFI, cellular network, Bluetooth network, satellite network, or the like. A function of VOC 123 is to gather or capture real-time surrounding information as well as exterior information when vehicle 102 is moving.

CBN 104 includes various digital computing systems, such as, but not limited to, server farm 120, routers/switches 121, cloud administrators 119, connected computing devices 116-117, and network elements 118. A function of CBN 104 is to provide cloud computing which can be viewed as on-demand Internet based computing service with enormous computing power and resources. Another function of CBN 104 is to improve or inferred attentional labeled data via correlating captured real-time data with relevant cloud data.

MLC 106, in one embodiment, provides, refines, trains, and/or distributes models 115 such as AI model based on information or data which may be processed and sent from CBN 104. It should be noted that the machine learning makes predictions based on models generated and maintained by various computational algorithms using historical data as well as current data. A function of MLC 106 is that it is capable of pushing information such as revised AI model or prediction model to vehicle 102 via a wireless communications network 114 constantly or in real-time.

To identify or collect operator attention (or ability) of vehicle 102, an onboard AI model which could reside inside of VOC 123 receives a triggering event or events from built-in sensors such as ABS, wheel slippery, turning status, engine status, and the like. The triggering event or events may include, but not limited to, activation of ABS, rapid steering, rapid breaking, excessive wheel slip, activation of emergency stop, and on. Upon receiving triggering events via vehicular status signals, the recording or recorded images captured by inward facing camera or 360 camera are forwarded to AIA system which resides at CBN 104.

In one embodiment, triggering events indicate an inattentional, distracted, and/or dangerous driver. For example, upon detecting a potential dangerous event, CBN 104 issues warning signal to driver or operator 109 via, for instance, a haptic signal, or shock to operator 109 notifying a potential collision. In addition, the dangerous event or events are recorded for report. It should be noted that a report describing driver's behavior as well as number occurrence relating to dangerous events can be useful. For example, such report can be obtained by insurance company for insurance auditing, by law enforcement for accident prevention, by city engineers for traffic logistics, or by medical stuff for patient safety.

During an operation, inward facing camera 126 captures facial images of driver or operator 109 including the location in which operator's eyes focusing. Upon verifying with CBN 104, a focal direction 107 of operator 109 is identified. After obtaining and processing external images relating to focal direction 107, a possible trajectory 105 in which the location is looked at is obtained. Trajectory 105 and focal direction 107 are subsequently processed and combined in accordance with stored data in the cloud. The object, which is being looked at by operator 109, is identified. In this example, the object is a house 103 nearby the road.

The AIA system records and examines various status such as pedal position, steering wheel position, mirror setting, seat setting, engine RPM, whether the seat belts are clipped in, internal and external temperature, et cetera. With the advent of machine learning, a broad class of derived data and metadata can be extracted from sensors and be used to improve the user experience of being in or driving a vehicle. It should be noted that the extracted data includes confidence and probability metrics for each data element that the machine learning models generate. Such data, which changes in real-time, is presented to an application layer that can use the full context of vehicle in real-time.

Operator 109, in one aspect, can be any driver capable of operating a vehicle. For example, operator 109 can be a teen driver, elderly driver, professional race driver, fleet driver(s), and the like. The fleet drivers can be, but not limited to, UPS (United Parcel Service) drivers, police officers, Federal Express drivers, taxi drivers, Uber drivers, Lyft drivers, delivery drivers, bus drivers, and the like.

An advantage of using an AIAS is to leverage cloud information as well as embedded data to generate a report of VMP which can reduce traffic accidents and enhance public safety by improving vehicle mechanical condition.

Figure 1B:
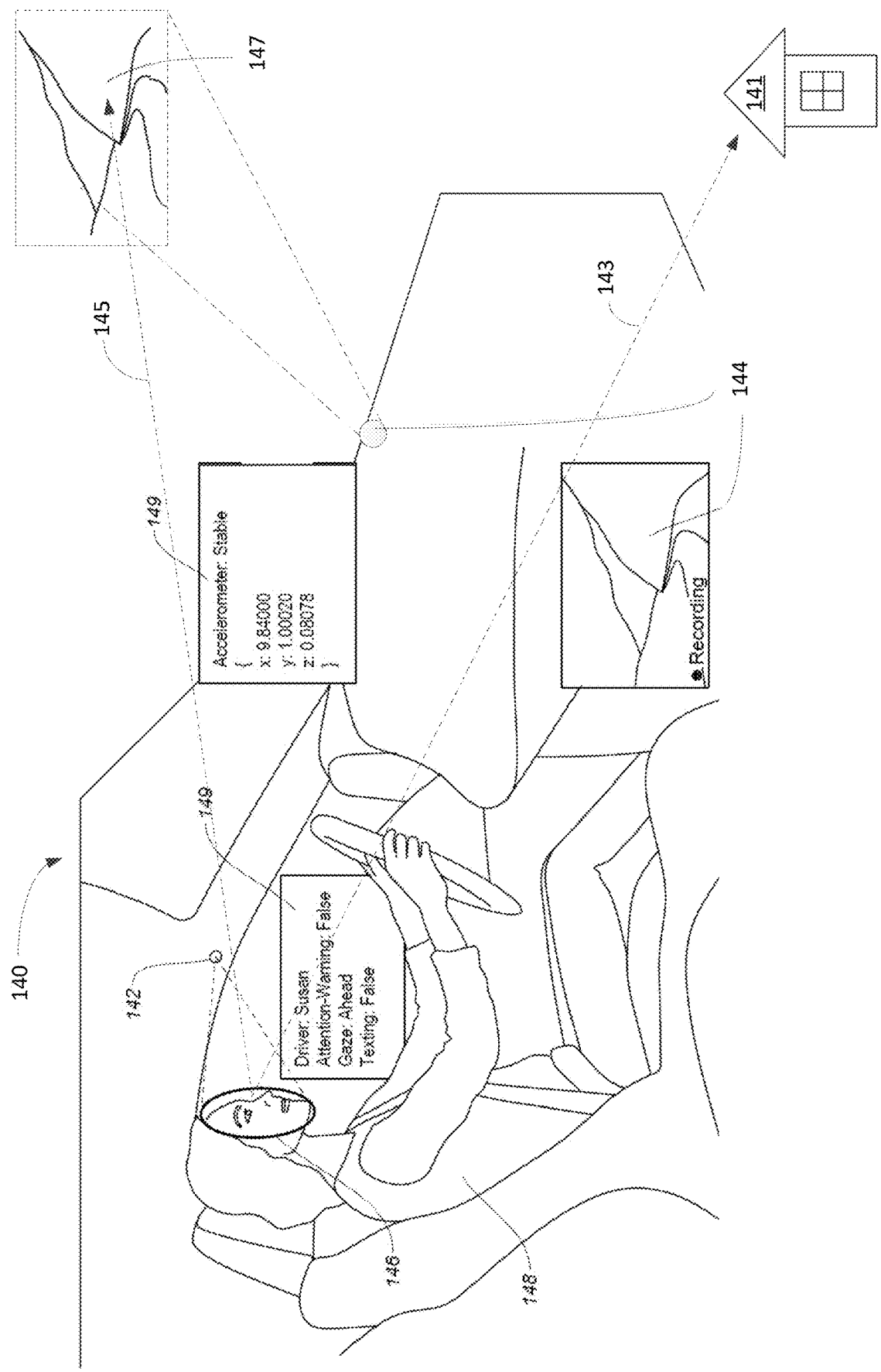

FIG. 1B is a block diagram 140 illustrating artificial intelligence analytic service ("AIAS") capable of predicting vehicle mechanical performance ("VMP") using a virtuous cycle in accordance with one embodiment of the present invention. Diagram 140 illustrates a driver 148, inward facing camera(s) 142, and exterior camera 144. In one aspect, camera 142, also known as interior camera or 360 degree camera, monitors or captures driver's facial expression 146 and/or driver (or operator) body language. Upon reading status 149 which indicates stable with accelerometer, ahead with gaze, hands on steering wheel (no texting), the AIA model concludes that driver is behaving normally. In one example, driver's identity ("ID") can be verified using images captured by interior camera 142.

AIA model, for example, is able to detect which direction driver 148 is looking, whether driver 148 is distracted, whether driver 148 is texting, whether identity of driver is determined via a facial recognition process, and/or where driver 148 pays attention. It should be noted that the car may contain multiple forward-facing cameras (or 360-degree camera(s)) 144 capable of capturing a 360 degree view which can be used to correlate with other views to identify whether driver 148 checks back-view mirror to see cars behind the vehicle or checks at side view of vehicle when the car turns. Based on observed information, the labeled data showing looking at the correct spots based on traveling route of car can illustrate where the driver pays attention. Alternatively, the collected images or labeled data can be used to retrain the AIA model which may predict the safety rating for driver 148.

During an operation, the interior images captured by inward facing camera(s) 142 can show a location in which operator 148 is focusing based on relative eye positions of operator 148. Once the direction of location such as direction 145 is identified, the AIA model obtains external images captured by outward facing camera(s) 144. After identifying image 145 is where operator pays attention based on direction 145, the image 147 is recorded and process. Alternatively, if AIA model expects operator 148 to look at the direction 145 based on current speed and traffic condition while detecting operator 148 actually looking at a house 141 based on trajectory view 143 based on the captured images, a warning signal will be activated.

It should be noted that the labeled data should include various safety parameters such as whether the driver looks left and/or right before crossing an intersection and/or whether the driver gazes at correct locations while driving. The AIA model collects data from various sensors, such as Lidar, radar, sonar, thermometers, audio detector, pressure sensor, airflow, optical sensor, infrared reader, speed sensor, altitude sensor, and the like, to establish operating environment. The information can change based on occupant(s) behavior in the vehicle or car. For example, if occupants are noisy, loud radio, shouting, drinking, eating, dancing, such behavior(s) can affect overall parameters as bad driving behavior.

Figure 1C:
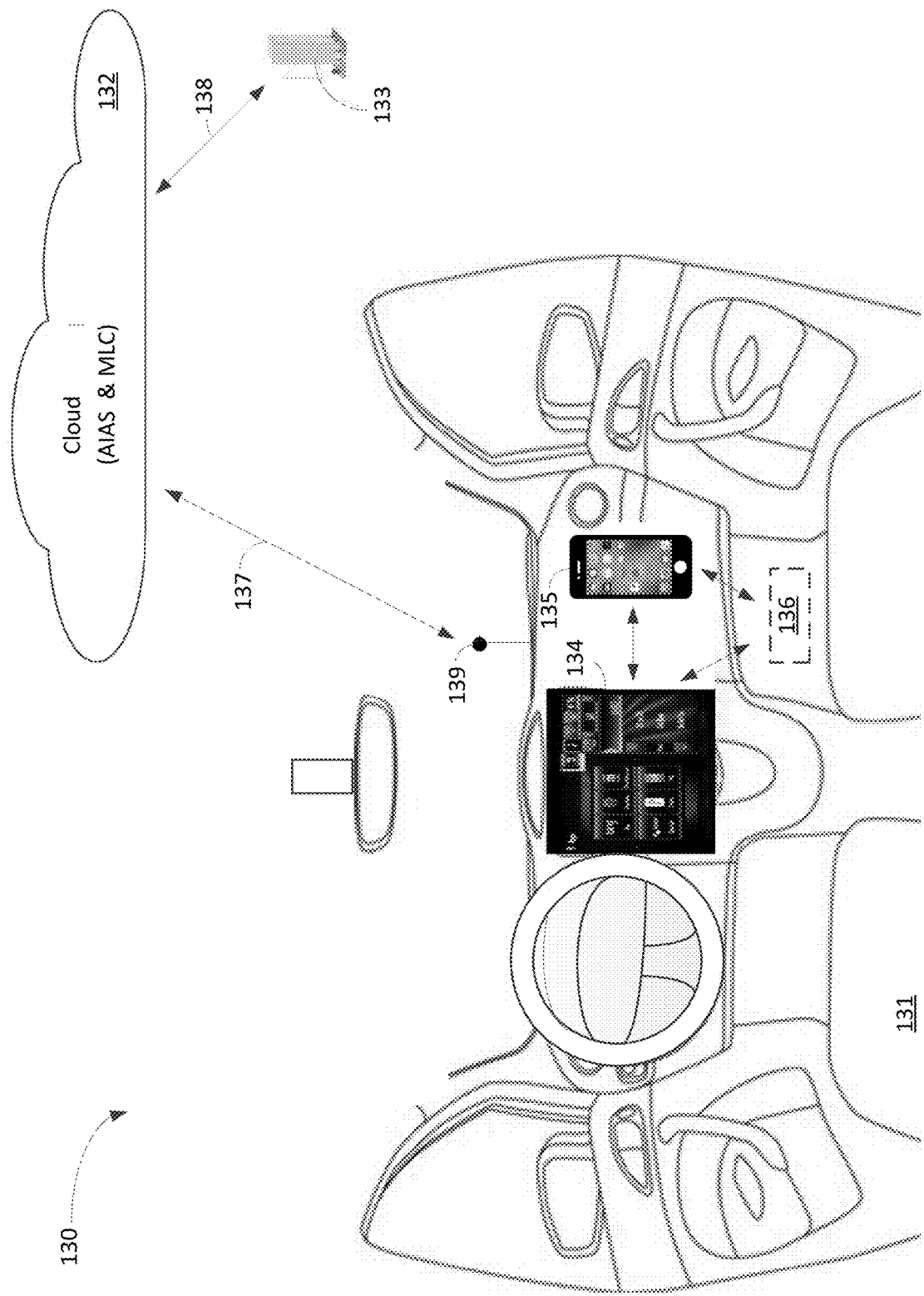
FIG. 1C is a block diagram illustrating a process of generating reports relating to vehicle as well as driver status using an AIA model via a virtuous cycle in accordance with one embodiment of the present invention.

FIG. 1C is a block diagram 130 illustrating a process of generating reports relating to driver status using an AIA model via a virtuous cycle in accordance with one embodiment of the present invention. Diagram 130 includes vehicle 131, cloud 132, and subscriber 133 wherein cloud 132 can further includes machine learning centers, historical driver data, and big data. In one embodiment, the AIA model, at least partially residing in cloud 132, is capable of providing AIAS to subscriber(s) 133. It should be noted that the underlying concept of the exemplary embodiment(s) of the present invention would not change if one or more blocks (circuit or elements) were added to or removed from diagram 130.

Vehicle 131 includes an infotainment unit 134, smart phone 135, VOC 136, and antenna 139. In one embodiment, infotainment unit 134 is coupled to head-end unit such as VOC 136 to collect information about driving habit, skill, and/or ability associated with an operator based on driver's condition, exterior environment, and internal equipment/vehicle status. Driver's condition includes driver ID, detected distractions such as talking over a phone, texting, occupant distraction, and the like. Exterior environment refers to traffic condition, road condition, whether condition, and/or nearby drivers. The equipment or vehicle status indicates automobile mechanical conditions, such as ABS application, sharp steering, hard braking, sudden acceleration, traction control activation, windshield wipers movement, and/or airbag deployment. The collected information is subsequently forwarded to cloud 132 for processing.

Subscriber 133, in one example, can be insurance company, family members, law enforcement, car dealers, auto manufactures, and/or fleet companies such as Uber™ or UPS™. In one aspect, subscriber 133 is an insurance company which wants to assess risks associated with certain group of drivers such as teen drivers or elderly drivers based on prediction reports generated by AIAS. For example, upon receipt of collected information from vehicle 131 to cloud 132 as indicated by numeral 137, AIAS in cloud 132 generates a prediction report associated with a particular driver based on the driver's historical data as well as big data. The prediction report is subsequently forwarded to subscriber 133 from cloud 132 as indicated by number 138.

Smart phone 135, which can be an iPhone™ or Android™ phone, can be used for identifying driver's ID as well as provides communication to cloud 132 via its cellular network access. Smart phone 135 can also be used to couple to VOC 136 for facilitating hyperscale or data scale from cloud data to embedded data. Similarly, the embedded data can also be scaled before passing onto the cloud.

An advantage of employing AIAS is that it can provide a prediction relating to VMP and/or VFP in connection to a group of vehicles to provide vehicle intelligence to drivers as well as subscribers. For example, AIAS can predict or warn a possible mechanical failure or flat tire in a near future.

Figure 1D:
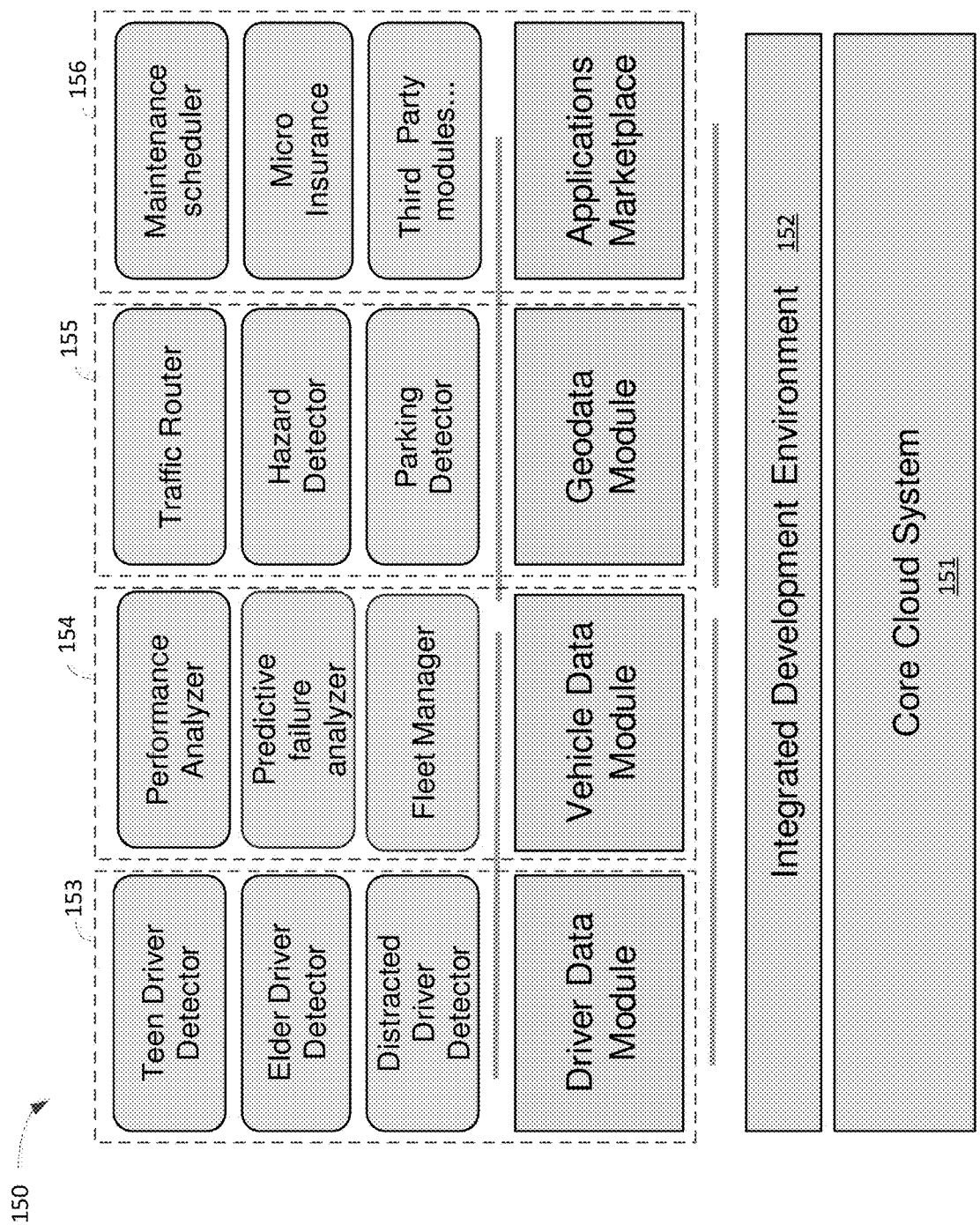
FIG. 1D is a block diagram illustrating an integrated development environment ("IDE") configured to host various models for providing AIAS via a virtuous cycle in accordance with one embodiment of the present invention.

FIG. 1D is a block diagram 150 illustrating an IDE 152 configured to host various models for providing AIAS via a virtuous cycle in accordance with one embodiment of the present invention. Diagram 150 includes a core cloud system 151, IDE 152, driver data module 153, vehicle data module 154, geodata module 155, and applications marketplace 156. While IDE 152 resides within core cloud system 151, IDE 152 are configured to host various modules such as modules 153-156. It should be noted that the underlying concept of the exemplary embodiment(s) of the present invention would not change if one or more blocks (modules or elements) were added to or removed from diagram 150.

Driver data module 153, in one embodiment, includes a teen driver detector, elder driver detector, and distracted driver detector. The teen driver detector, in one example, monitors teen drivers based on a set of predefined rules. The predefined rules are often set by a subscriber such as an insurance company or parents. The elder driver detector is responsible to monitor elderly drivers' ability to continue driving according to a set of predefined rules. Based on the detected and/or collected data, a prediction report can be automatically generated and forwarded to subscriber(s) in an agreed or subscribed time interval. The distracted driver detector, in one embodiment, is used to detect distracted or disabled drivers and reports such distracted drivers to authority for enhancing public safety. Upon collecting data from teen driver detector, elder driver detector, and distracted driver detector, driver data module 153 forwards the collected data to IDE 152 for AIAS processing.

Vehicle data module 154 includes a performance analyzer, predictive failure analyzer, and fleet manager. The performance analyzer, in one example, is used to analyze and verify internal vehicle mechanical performance. For instance, tire slippage may be detected by the performance analyzer. The predictive failure analyzer monitors vehicle maintenance and/or repair before the failure of a particular part or device. The fleet manager, in one example, is used to monitor its fleet cars. For example, UPS tracks and/or Uber vehicles can be tracked and analyzed to predict the operating efficiency and potential accidents. For example, after receipt of data from performance analyzer, predictive failure analyzer, and fleet manager, vehicle data module 154 forwards the collected data to IDE 152 for AIAS processing.

Geodata module 155 includes a traffic router, hazard detector, and parking detector. The traffic router, in one aspect, is used to provide a real-time alternative route in the present traffic congestion. In one embodiment, the traffic router is able to communicate with other nearby vehicles, stationary street cameras, and/or nearby drones to obtain current situation. For instance, the traffic router can obtain reason(s) for congestion and based on the reason, such as an accident, road construction, sinkhole, damaged bridge, or slow walker, an alternative route(s) may be provided. The Hazard detector, in one embodiment, detects hazard conditions such as potholes, chemical spills, and/or road obstacles. The parking detector, in one embodiment, is able to automatically identify where the vehicle can park, how long the vehicle had parked, how much parking fee should be assessed. After receipt of data from traffic router, hazard detector, and parking detector, geodata module 155 forwards the collected data to IDE 152 for AIAS processing.

Applications marketplace 156 includes maintenance scheduler, micro insurance, and third-party modules. Applications marketplace 156, in one aspect, facilitates third-party communications, software updates, applications, third-party modules, and the like. Third-party includes insurance company, car deals, car repair shops, police, government agencies, city transportation, and/or other subscribers. In one aspect, Applications marketplace 156 is configured receive subscriptions as well as sending prediction reports to subscribers based on a set of predefined time intervals.

In one embodiment, an AIA system capable of predicting an event or risk associated with an operator driving a vehicle includes multiple interior and exterior sensors, VOC, core cloud system or cloud. Cloud 151, in one example, includes an IDE 152 configured to host driver data module 153, vehicle data module 154, geodata module 155, and application marketplace module 156. In one aspect, the AIA system is able to predict a future event or potential risk based on current data, driver's historical data, and big data. The vehicle data indicates a collection of attributes, such as driving speed, braking frequency, sudden acceleration, ABS triggering, geographic locations, driver's personal records, and/or detected distractions, to describe driver's behavior, skill, cognitive condition, ability, and/or physical condition. The big data, in one example, refers to a set of data collected from large population having similar attributes as the targeted driver's attributes. For example, a targeted driver is a teen age driver, the large population would be teen age drivers.

The interior and exterior sensors, in one example, installed on a vehicle collect real-time data relating to external surroundings and interior settings. The vehicle or car is operated by the driver or targeted driver. The exterior sensors include outward facing cameras for collecting external images representing a surrounding environment in which the vehicle operates. The interior sensors include inward facing cameras for collecting interior images inside of vehicle including operator facial expression as well as operator's attention. The external images include real-time images relating to road, buildings, traffic lights, pedestrian, or retailers. The interior images include a set of interior sensors obtaining data relating to at least one of operator's eyes, facial expression, driver, and passage. It should be noted that interior and exterior cameras can detect a direction in which the operator is looking.

The VOC, in one example, is configured to generate a current data representing current real-time status in accordance with the collected data. For instance, the VOC is able to identify operator's driving ability in response to the collected internal images and the collected external images. In addition, driver or operator's ID can also be verified by the VOC.

Driver data module 153, in one aspect, includes a teen driver detector, elder driver detector, and distracted driver detector and is able to assess future predictions. The teen driver detector is able to report teen's driving behavior to a subscriber based on the current data and historical data. For example, depending on the subscription supplied by the subscriber, the report relating to teen's driving behavior or ability can be periodically generated and sent to subscribers. The elder driver detector is also able to report elder's driving behavior to a subscriber based on the current data and historical data.

Vehicle data module 154 contains a performance analyzer, predictive failure analyzer, fleet manager for collecting vehicle related data. Geodata module 155 includes a traffic router, hazard detector, and parking detector for detecting locations or physical locations. Application marketplace module 156 contains a maintenance scheduler and micro insurance for facilitating and/or enlisting subscribers. For example, the micro insurance is able to generate a report describing teen's driving behavior to an insurance subscriber according to the big data, current data, and historical data.

The AIA system, in one aspect, further includes audio sensors configured to provide metadata relating to audio sound which occurs outside the vehicle or inside the vehicle. For example, the AIA system may include exterior audio sensors collecting exterior sound outside of the vehicle. Similarly, multiple interior audio sensors may be used to collect sound inside of the vehicle. It should be noted that application marketplace module 156 includes a third-party module which is able to host various third-party applications, such as, but not limited to, interactive advertisement, driverless vehicle application, drone application, and the like.

An advantage of using the AIA system is that it is able to facilitate AIAS to provide VMP using detected real-time data, historical data, and big data.

Figure 1E:
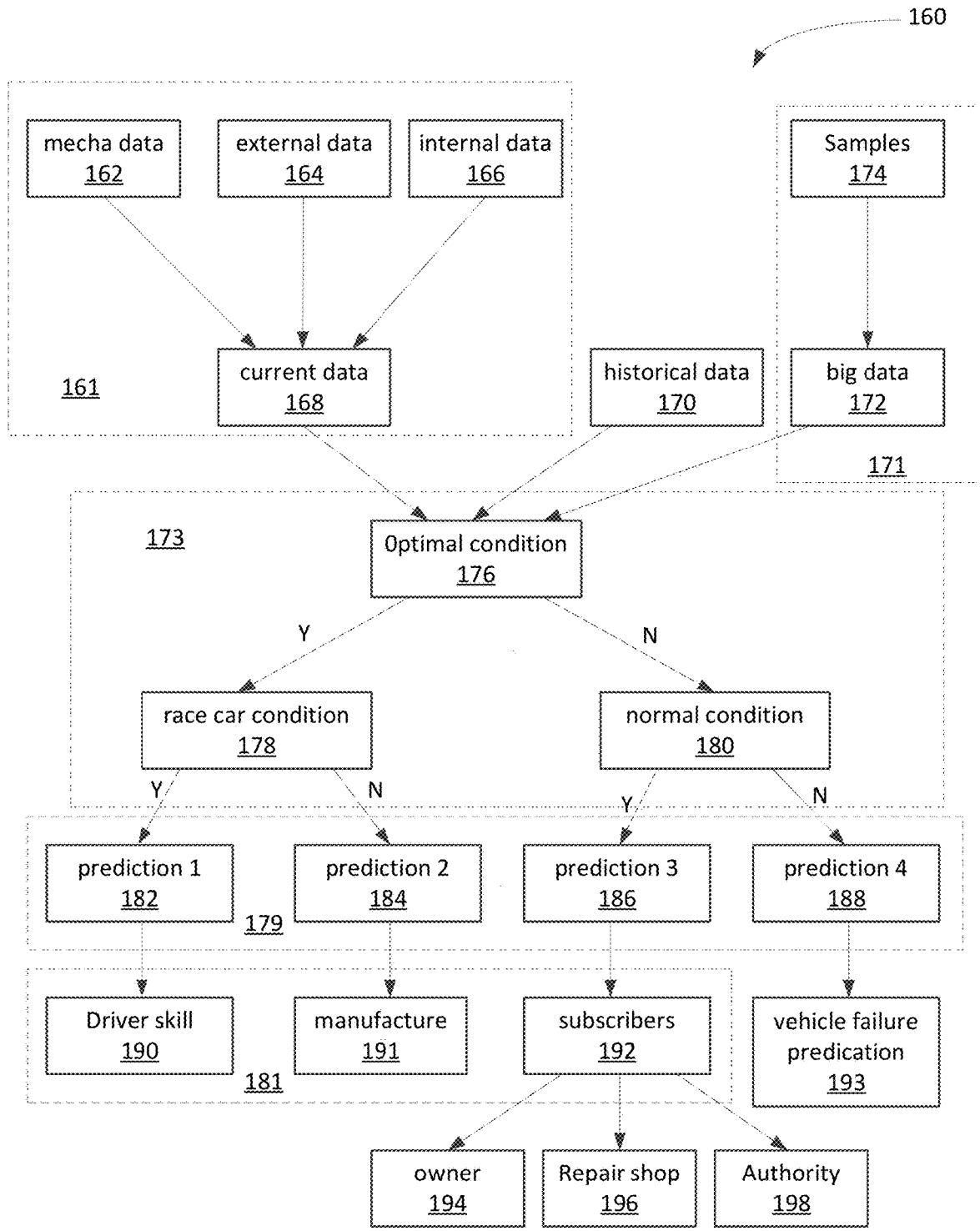
FIG. 1E is a logic diagram illustrating an AIA system configured to provide a prediction relating to vehicle mechanical performance ("VMP") via a virtuous cycle in accordance with one embodiment of the present invention.

FIG. 1E is a logic diagram 160 illustrating an AIA system configured to provide a prediction relating to vehicle mechanical performance ("VMP") via a virtuous cycle in accordance with one embodiment of the present invention. Diagram 160 includes a real-time information module 161, historical data 170, cloud big data 171, optimal module 173, prediction module 179, subscription module 181, and vehicle failure prediction ("VFP") module 193. Optimal module 173, in one embodiment, includes optimal module 176, race car module 178, and normal condition module 180. It should be noted that the underlying concept of the exemplary embodiment(s) of the present invention would not change if one or more blocks (modules or elements) were added to or removed from diagram 160.

Real-time information module 161, in one aspect, includes mechanical data 162, external data 164, and internal data 166. Mechanical data 162 is obtained by various sensors placed near or on the mechanical devices. For example, sensors may be placed around tire and/or wheel to obtain real-time information relating to tire slippage, wheel slippage, unusual noise, ABS (anti-skid braking system) deployment, and the like. Similarly, sensors can be placed around engine to read engine temperature, vibration, sound, and so on. In one aspect, mechanical data 162 includes readings or measurements of temperature, humidity, vibration, sound/noise, and the like.

External data 164, in one example, includes real-time information relating to read condition, weather condition, traffic congestions, nearby cars, traveling directions, and geographic locations of the vehicle. External data 164 are obtained and/or collected by exterior sensors mounted on the vehicle. Internal or interior data 166 includes real-time readings about interior of vehicle, such as, not limited to, driver, driver gaze, passengers, smoking, drinking, texting, talking, and/or reading phone(s). Interior data 166 are obtained and/or collected by interior sensors and/or cameras. The component of current data 168, in one embodiment, gathers real-time inputs from mechanical data 162, external data 164, and internal data 166. The real-time inputs are categorized, sorted, and organized whereby relevant current data is stored while irrelevant data is discarded.

Historical data 170, in one example, is the relevant data for the vehicle over a period of time. Historical data 170 can be stored in the cloud data. Alternatively, historical data 170 is stored locally. Also, a portion of historical data 170 is stored in the cloud while a portion of historical data 170 is embedded in the vehicle storage or VOC. A function of historical data 170 can provide a quick examination as to whether the current real-time data is normal or not in comparison with the historical data.

Cloud big data 171 includes samples 174 and big data 172 wherein cloud big data 171 is resided in the cloud or cloud computing. Big data 172, in aspect, include a large number of samples 174 that obtain from a large pool of vehicles having similar attributes as the targeted vehicle. The attributes include, but not limited to, similar cars, similar total mileage, similar year produced, similar geographic location, similar features, similar mechanical functions, similar maintenance records, similar drivers, et cetera. An advantage of using the big data is that it may contain information having similar problems or failures for cars like the targeted vehicle. For example, big data 172 may suggest to vehicle owner to take the vehicle to the dealer because many similar cars like the vehicle have overheating problems.

Optimal module 173, in one embodiment, includes an optimal condition 176, race car condition 178, and normal condition 180. After receiving and evaluating inputs from current data 168, historical data 170, and big data 172, optimal condition 176, based on a set of predefined rules, examines and determines whether the vehicle or targeted vehicle is in its optimal condition. In one example, the optimal condition means the vehicle meets performance requirements as manufactured and shows no sign of wear and tear. If the optimal condition is met, the process proceeds to race car condition 178. If the optimal condition fails to meet, the process proceeds to normal condition 180 since certain level of wear and tear can be normal. Race car condition 178, in one aspect, provides information as to whether the vehicle is used for race or just normal ordinary use. Normal condition 180 provides information as to whether the current condition is normal wear and tear, or whether the vehicle is about to break down or fail.

Predication module 179 includes four (4) predictions 182-188 wherein prediction 1 receives signal from race car condition 178 indicating the vehicle is used for car race. Based on a set of predefined rules for car race criteria, a prediction report is generated indicating various AIA indications. For example, AIA indications can show where and when the tire slipped while the vehicle was traveling at certain speed. Based on the design of the vehicle and the road condition, the driver may have made some mistakes. Such report is subsequently forwarded to subscription module 181 indicating driver skills and/or mistakes as indicated by numeral 190.

Prediction 2 receives signals from race car condition 178 indicating the vehicle is not used for car race. Based on a set of predefined non-race car rules, a prediction report is generated indicating various AIA indications which is subsequently sent to subscription module 181 such as manufacture as a subscriber. For example, based on the report, the manufacture can better understand the quality of its vehicles as well as shortcomings.

Prediction 3 receives signal from normal condition 180 indicating the vehicle is normal even though some wears and tears are considered normal. Based on a set of predefined rules for normal criteria, a prediction report is generated indicating various AIA indications indicating that certain wears and tears are normal and predicts the time frame that the vehicle is likely to require maintenance. For example, AIA indications can show where and when the tire slipped while the vehicle was traveling at certain speed. Based on the design of the vehicle and the road condition, certain parts such as tire(s) may require replacement at a predicted distance future. For example, the prediction reports may suggest to subscriber 192 that the tires need to be replaced in three months.

Prediction 4 receives signal from normal condition 180 indicating the vehicle is not normal and certain mechanical parts may require services. Based on a set of predefined rules for VFP criteria, a prediction report is generated indicating various AIA indications indicating that one or more parts is about to fail. The process proceeds to VFP to handle the failures.

Subscription module 181 includes driver 190, manufacture 191, and some subscribers 192 which includes owner 194, repair shops 196, authority 198, police department, bus companies, tracking companies, delivery companies, and so on. Authority 198 can be department of transportation which, for instance, wants to know the safety features of electrical cars. The prediction report can be helpful to DOT to assess whether certain vehicle should be on the road or not.

An advantage of using VMP is that the vehicle is capable of initiating feedback to subscribers such as driver or manufactures or insurance company regarding the vehicle condition as well as vehicle safety using its AIA system. For example, the feedback can help driver skill, manufactures, insurance rates, road safety, repair services, and automatic maintenance scheduling.

Figure 1F:
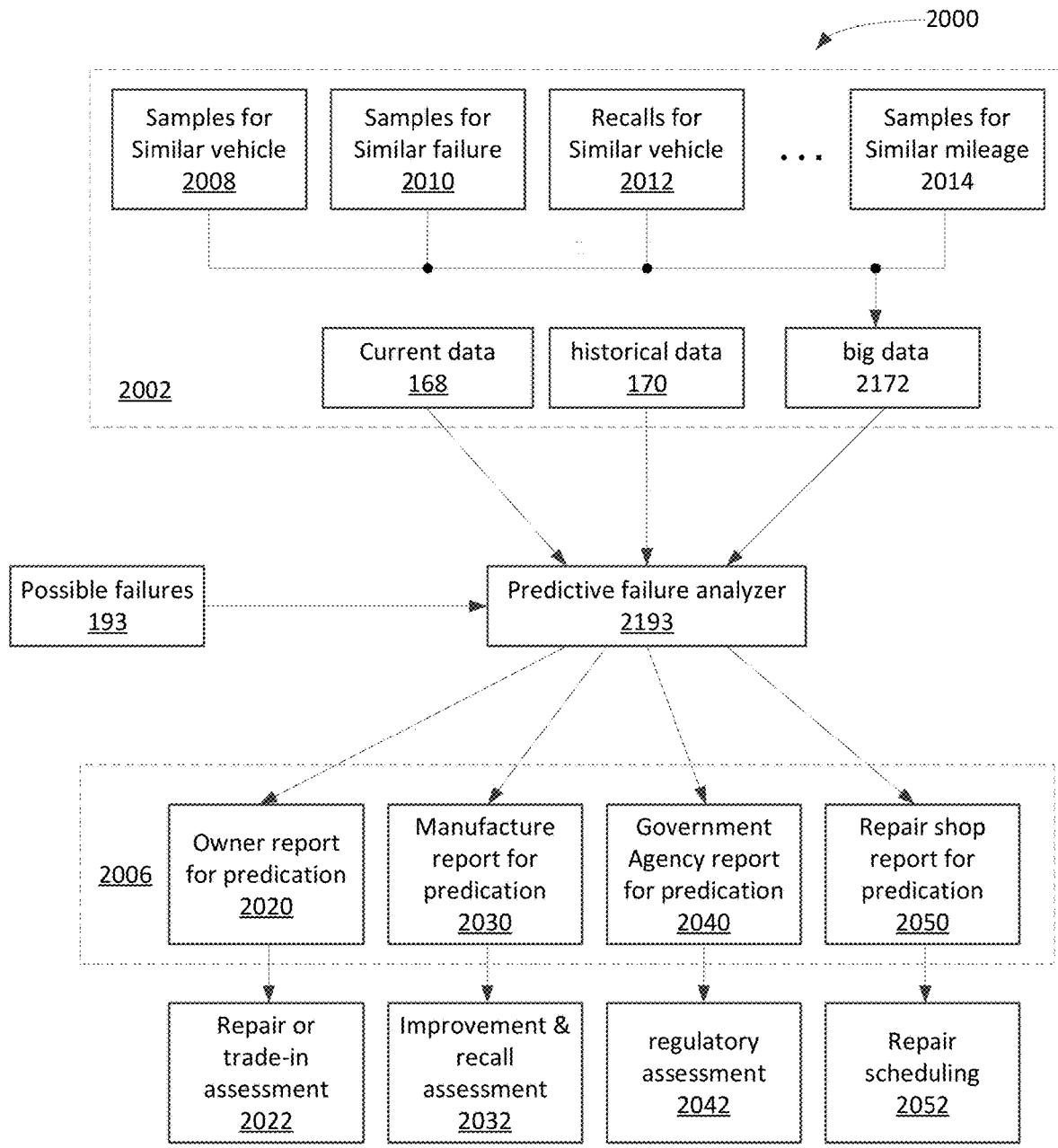
FIG. 1F is a logic diagram illustrating an AIA system facilitated configured to provide a vehicle failure prediction ("VFP") via a virtuous cycle in accordance with one embodiment of the present invention.

FIG. 1F is a logic diagram 2000 illustrating an AIA system facilitated configured to provide a vehicle failure prediction ("VFP") via a virtuous cycle in accordance with one embodiment of the present invention. Diagram 2000 includes inputs 2002, predictive failure analyzer 2193, prediction 2006, and various subscribers. Possible failure 193, which is the same or similar to VFP 193 shown in FIG. 1E, triggers a process of predictive failure analyzer 2193 since VMP indicates a possible failure(s). It should be noted that the underlying concept of the exemplary embodiment(s) of the present invention would not change if one or more blocks (modules or elements) were added to or removed from diagram 2000.

Input 2002 includes current data 168, historical data 170, and big data 2172 wherein big data 2172 further connected to simples for similar vehicle 2008, samples for similar failure 2010, recalls for similar vehicle 2012, and samples for similar mileage 2014. It should be noted that additional samples may be taken by big data 2172. Big data 2172, in aspect, include a large number of samples across a large geographic area containing a large pool of vehicles having similar attributes as the targeted vehicle. The attributes include, but not limited to, similar cars, similar total mileage, similar year produced, similar geographic location, similar features, similar mechanical functions, similar maintenance records, similar drivers, similar failures, similar recalls, similar reports, et cetera.

Based on the real-time data from current data 168, historical collected information associated with the vehicle from historical data 170, and big data 2172, predicative failure analyzer 2193, based on a set of predefined failure rules, generates predictions 2006. In one embodiment, predictive failure analyzer 2193 includes multiple AI models trained by virtuous cycles. For example, a failure predictive AI model is configured to assessing a likelihood failure rate as well as failure time based on current data, historical data, and big data.

Predications 2006 includes owner report 2020, manufacture report 2030, government agency report 2040, and repair shop report 2050. For instance, owner report 2020 is a summary status report for the vehicle owner(s) 2022 indicating the likelihood failure in near future. The report, in one embodiment, is configured to provide recommendations as repairable versus trade-in assessment.

Manufacture report 2030 is a summary status report for the vehicle manufacture(s) 2032 indicating when and where is the failure. For example, such status report can indicate a nationwide recall for fixing the problem(s). Also, the failure predictive AI model may suggest improvements for the new vehicles based on current data, historical data, and big data.

Government agency report 2040 is a summary status report for the government agency 2042 such as department of motor vehicle indicating whether such vehicle should be allowed to drive on the public road. For example, a newly designed electrical vehicle may be fire hazards if it reaches certain speed. Assessing a license fee for such vehicle can be different from other traditional vehicles. Also, the failure predictive AI model may suggest improvements to the department of motor vehicle before a more reasonable licensing fee is assessed.

Repair shop report 2050 is a summary status report for the repair scheduling block 2052 indicating when and where the vehicle will like to fail and when the vehicle should have a repair performed to avoid the failure. For example, when a dealer obtains such status report, it schedules an appointment with the driver or owner to repair the defects or failure before the vehicle stops working. In one aspect, the failure predictive AI model may automatically schedule an appointment with the owner to an available dealer or repair shop based on current data, historical data, and big data.

Figure 1G:
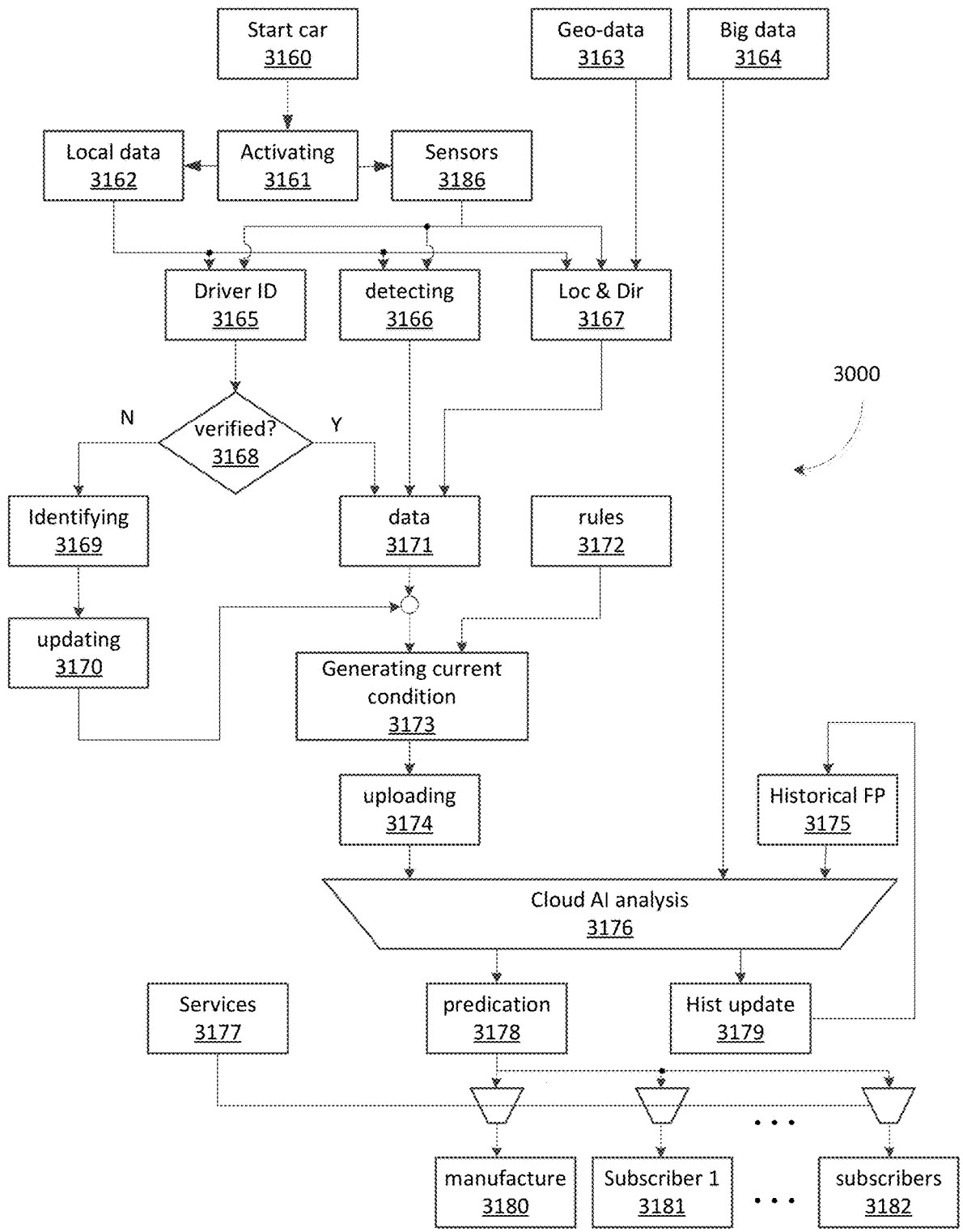
FIG. 1G is a logic diagram illustrating an AIA process facilitated by AIA system configured to provide VMP using big data via a virtuous cycle in accordance with one embodiment of the present invention.

FIG. 1G is a logic diagram illustrating an AIA process 3000 facilitated by AIA system configured to provide VMP using big data via a virtuous cycle in accordance with one embodiment of the present invention. At block 3160, the car or vehicle starts to move driving by a driver or operator. After starting the vehicle, the VOC of vehicle, at block 3161, activates various sensors at block 3186, and retrieves local data at block 3162. The local data, for example, includes last driver's ID, stored driver's fingerprint, and last known vehicle location before the vehicle stops. At block 3165, the driver ID is identified based on the inputs from local data at block 3162 and images detected by sensors at block 3186. At block 3168, the AIA process is able to determine whether an expected driver is verified. If the driver is the expected driver, the process proceeds to block 3171. If the driver is not the expected driver, the process proceeds to block 3169 for further identification. Upon identifying the driver, the driver's information is updated at block 3170. For example, the driver is not the same driver before the car or vehicle stops. It should be noted that the identification process can use the AIA system supported by the virtuous cycle.

At block 3166, various interior and exterior images, audio sound, and internal mechanical conditions are detected based on the input data from local data at block 3162 and sensors at block 3186. At block 3167, location of the vehicle and moving direction of the vehicle can be identified based on the geodata such as GPS (global positioning system) at block 3163, local data from block 3162, and images captured by sensors at block 3186. After collecting data from blocks 3166-3168, the process proceeds from block 3171 to block 3173. At block 3173, the process generates current data for VMP associated with the targeted vehicle according to collected data as well as a set of rules which can be obtained from block 3172. The current data is subsequently uploaded at block 3174.

At block 3176, the AIA process performs AI analysis based on the current data from block 3174, historical data from block 3175, and big data from block 3164. Based on the AI analysis, the process provides a prediction at block 3178. Depending on the subscribers at block 3177, various subscribers 3180-3182 including manufacture 3180 will receive the report relating to the prediction. It should be noted that historical data update module at block 3179 is used to update the historical data based on the current data.

Note that the expected driver can be, but not limited to, company driver, fleet driver, bus drivers, self-driving vehicles, drones, and the like. It should be noted that the underlying concept of the exemplary logic diagram 3000 showing one embodiment(s) of the present invention would not change if one or more blocks (components or elements) were added to or removed from diagram 3000.

Figure 2A:
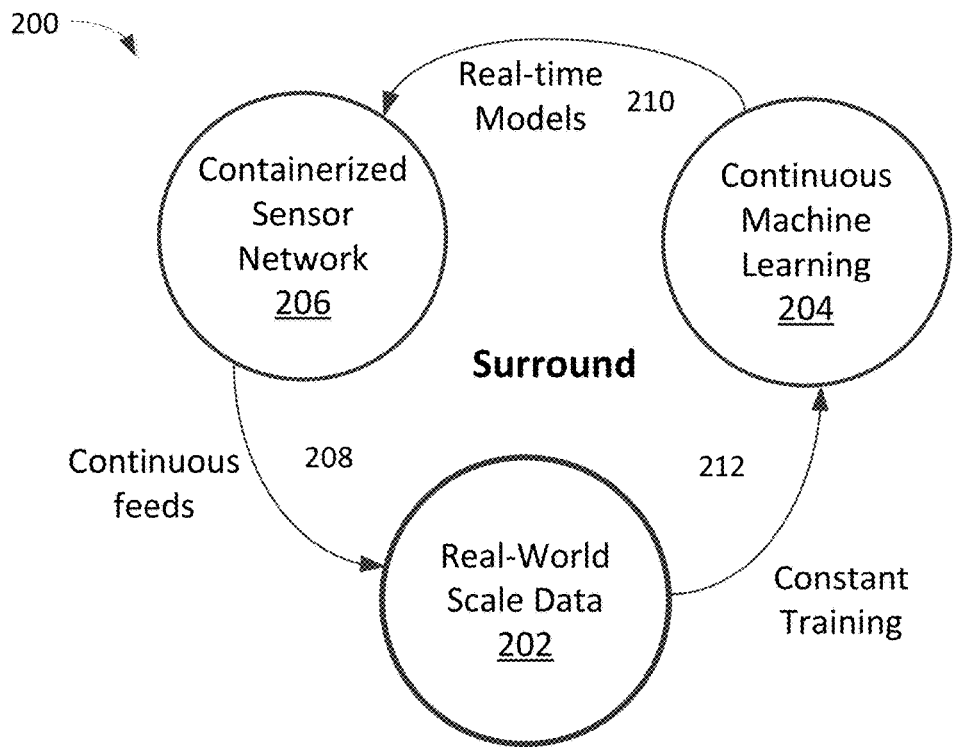
FIGS. 2A-2B are block diagrams illustrating a virtuous cycle capable of facilitating AIAS using IA model in accordance with one embodiment of the present invention.
Figure 2B:
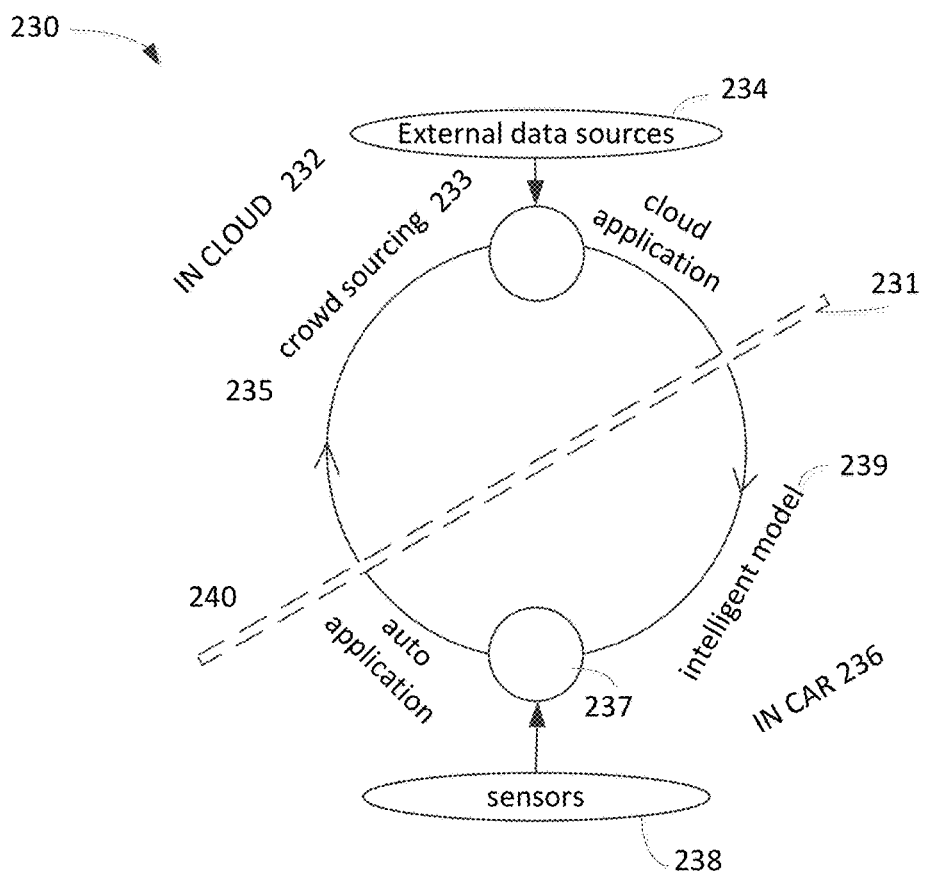

FIGS. 2A-2B are block diagrams 200 illustrating a virtuous cycle capable of facilitating AIAS using IA model in accordance with one embodiment of the present invention. Diagram 200, which is similar to diagram 100 shown in FIG. 1A, includes a containerized sensor network 206, real-world scale data 202, and continuous machine learning 204. In one embodiment, continuous machine learning 204 pushes real-time models to containerized sensor network 206 as indicated by numeral 210. Containerized sensor network 206 continuously feeds captured data or images to real-world scale data 202 with uploading in real-time or in a batched format. Real-world scale data 202 provides labeled data to continuous machine learning 204 for constant model training as indicated by numeral 212. It should be noted that the underlying concept of the exemplary embodiment(s) of the present invention would not change if one or more blocks (or elements) were added to or removed from FIG. 2A.

The virtuous cycle illustrated in diagram 200, in one embodiment, is configured to implement IAS wherein containerized sensor network 206 is similar to vehicle 102 as shown in FIG. 1A and real-world scale data 202 is similar to CBN 104 shown in FIG. 1A. Also, continuous machine learning 204 is similar to MCL 106 shown in FIG. 1A. In one aspect, containerized sensor network 206 such as an automobile or car contains a containerized sensing device capable of collecting surrounding information or images using onboard sensors or sensor network when the car is in motion. Based on the IA model, selective recording the collected surrounding information is selectively recorded to a local storage or memory.

Real-world scale data 202, such as cloud or CBN, which is wirelessly coupled to the containerized sensing device, is able to correlate with cloud data and recently obtained IA data for producing labeled data. For example, real-world scale data 202 generates IA labeled data based on historical IA cloud data and the surrounding information sent from the containerized sensing device.

Continuous machine learning 204, such as MLC or cloud, is configured to train and improve IA model based on the labeled data from real-world scale data 202. With continuous gathering data and training IA model(s), the IAS will be able to learn, obtain, and/or collect all available IAs for the population samples.

In one embodiment, a virtuous cycle includes partitionable Machine Learning networks, training partitioned networks, partitioning a network using sub-modules, and composing partitioned networks. For example, a virtuous cycle involves data gathering from a device, creating intelligent behaviors from the data, and deploying the intelligence. In one example, partition idea includes knowing the age of a driver which could place or partition "dangerous driving" into multiple models and selectively deployed by an "age detector." An advantage of using such partitioned models is that models should be able to perform a better job of recognition with the same resources because the domain of discourse is now smaller. Note that, even if some behaviors overlap by age, the partitioned models can have common recognition components.

It should be noted that more context information collected, a better job of recognition can be generated. For example, "dangerous driving" can be further partitioned by weather condition, time of day, traffic conditions, et cetera. In the "dangerous driving" scenario, categories of dangerous driving can be partitioned into "inattention", "aggressive driving", "following too closely", "swerving", "driving too slowly", "frequent breaking", deceleration, ABS event, et cetera.

For example, by resisting a steering behavior that is erratic, the car gives the driver direct feedback on their behavior—if the resistance is modest enough then if the steering behavior is intentional (such as trying to avoid running over a small animal) then the driver is still able to perform their irregular action. However, if the driver is texting or inebriated then the correction may alert them to their behavior and get their attention. Similarly, someone engaged in "road rage" who is driving too close to another car may feel resistance on the gas pedal. A benefit of using IAS is to identify consequences of a driver's "dangerous behavior" as opposed to recognizing the causes (texting, etc.). The Machine Intelligence should recognize the causes as part of the analysis for offering corrective action.

In one aspect, a model such as IA model includes some individual blocks that are trained in isolation to the larger problem (e.g. weather detection, traffic detection, road type, etc.). Combining the blocks can produce a larger model. Note that the sample data may include behaviors that are clearly bad (ABS event, rapid deceleration, midline crossing, being too close to the car in front, etc.). In one embodiment, one or more sub-modules are built. The models include weather condition detection and traffic detection for additional modules intelligence, such as "correction vectors" for "dangerous driving."

An advantage of using a virtuous cycle is that it can learn and detect object such as IA in the real world.

FIG. 2B is a block diagram 230 illustrating an alternative exemplary virtuous cycle capable of detecting IA in accordance with one embodiment of the present invention. Diagram 230 includes external data source 234, sensors 238, crowdsourcing 233, and intelligent model 239. In one aspect, components/activities above dotted line 231 are operated in cloud 232, also known as in-cloud component. Components/activities below dotted line 231 are operated in car 236, also known as in-device or in-car component. It should be noted that the underlying concept of the exemplary embodiment(s) of the present invention would not change if one or more blocks (or elements) were added to or removed from FIG. 2B.

In one aspect, in-cloud components and in-device components coordinate to perform desirable user specific tasks. While in-cloud component leverages massive scale to process incoming device information, cloud applications leverage crowd sourced data to produce applications. External data sources can be used to contextualize the applications to facilitate intellectual crowdsourcing. For example, in-car (or in-phone or in-device) portion of the virtuous cycle pushes intelligent data gathering to the edge application. In one example, edge applications can perform intelligent data gathering as well as intelligent in-car processing. It should be noted that the amount of data gathering may rely on sensor data as well as intelligent models which can be loaded to the edge.

Figure 3:
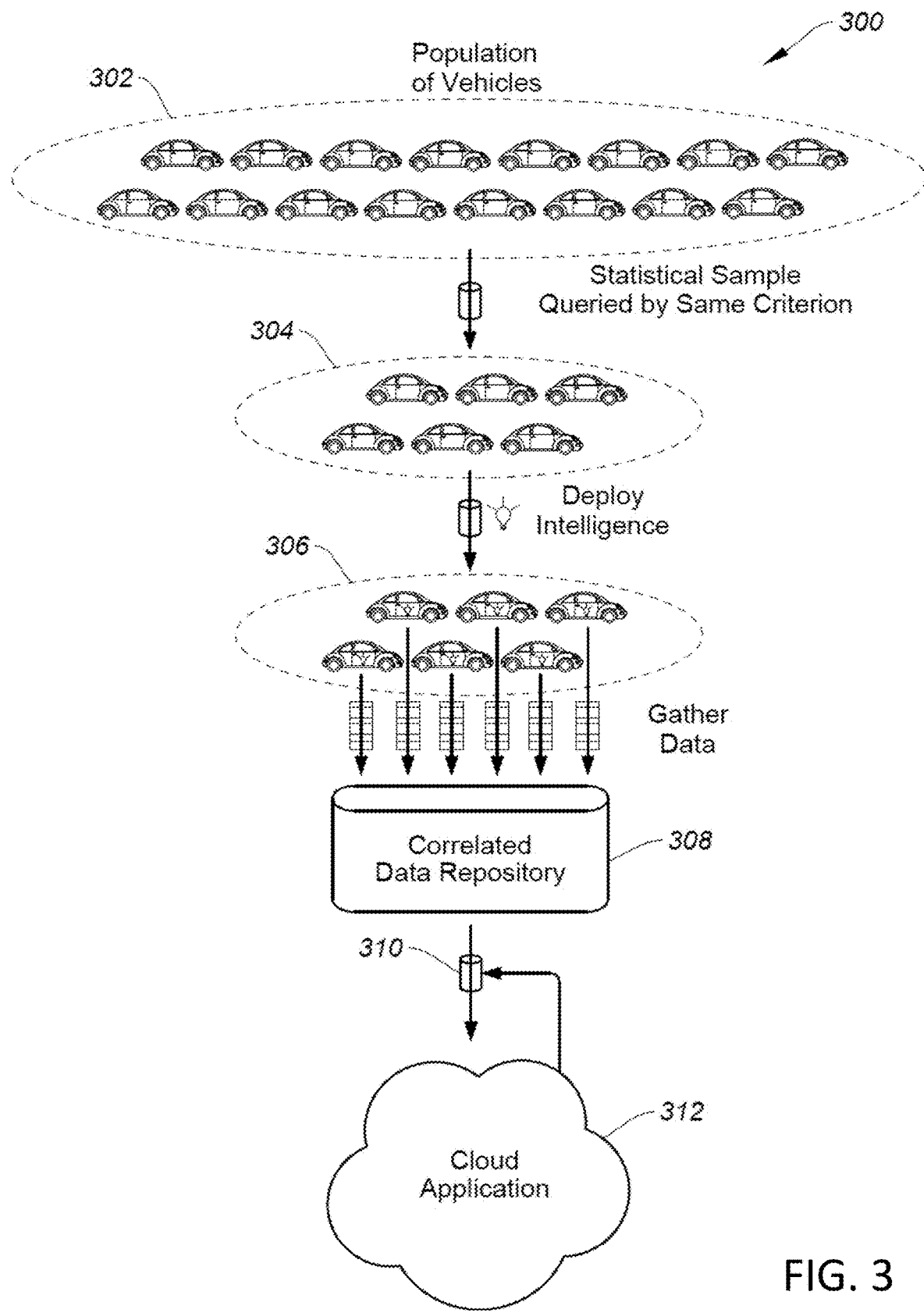
FIG. 3 is a block diagram illustrating a cloud based network using crowdsourcing approach to improve IA model(s) for AIAS in accordance with one embodiment of the present invention.

FIG. 3 is a block diagram illustrating a cloud based network using crowdsourcing approach to improve IA model(s) for AIAS in accordance with one embodiment of the present invention. Diagram 300 includes population of vehicles 302, sample population 304, model deployment 306, correlation component 308, and cloud application 312. It should be noted that the underlying concept of the exemplary embodiment(s) of the present invention would not change if one or more blocks (or samples) were added to or removed from FIG. 3.

Crowdsourcing is a process of using various sourcing or specific models generated or contributed from other cloud or Internet users for achieving needed services. For example, crowdsourcing relies on the availability of a large population of vehicles, phones, or other devices to source data 302. For example, a subset of available devices such as sample 304 is chosen by some criterion such as location to perform data gathering tasks. To gather data more efficiently, intelligent models are deployed to a limited number of vehicles 306 for reducing the need of large uploading and processing a great deal of data in the cloud. It should be noted that the chosen devices such as cars 306 monitor the environment with the intelligent model and create succinct data about what has been observed. The data generated by the intelligent models is uploaded to the correlated data store as indicated by numeral 308. It should be noted that the uploading can be performed in real-time for certain information or at a later time for other types of information depending on the need as well as condition of network traffic.

Correlated component 308 includes correlated data storage capable of providing a mechanism for storing and querying uploaded data. Cloud applications 312, in one embodiment, leverage the correlated data to produce new intelligent models, create crowd sourced applications, and other types of analysis.

Figure 4:
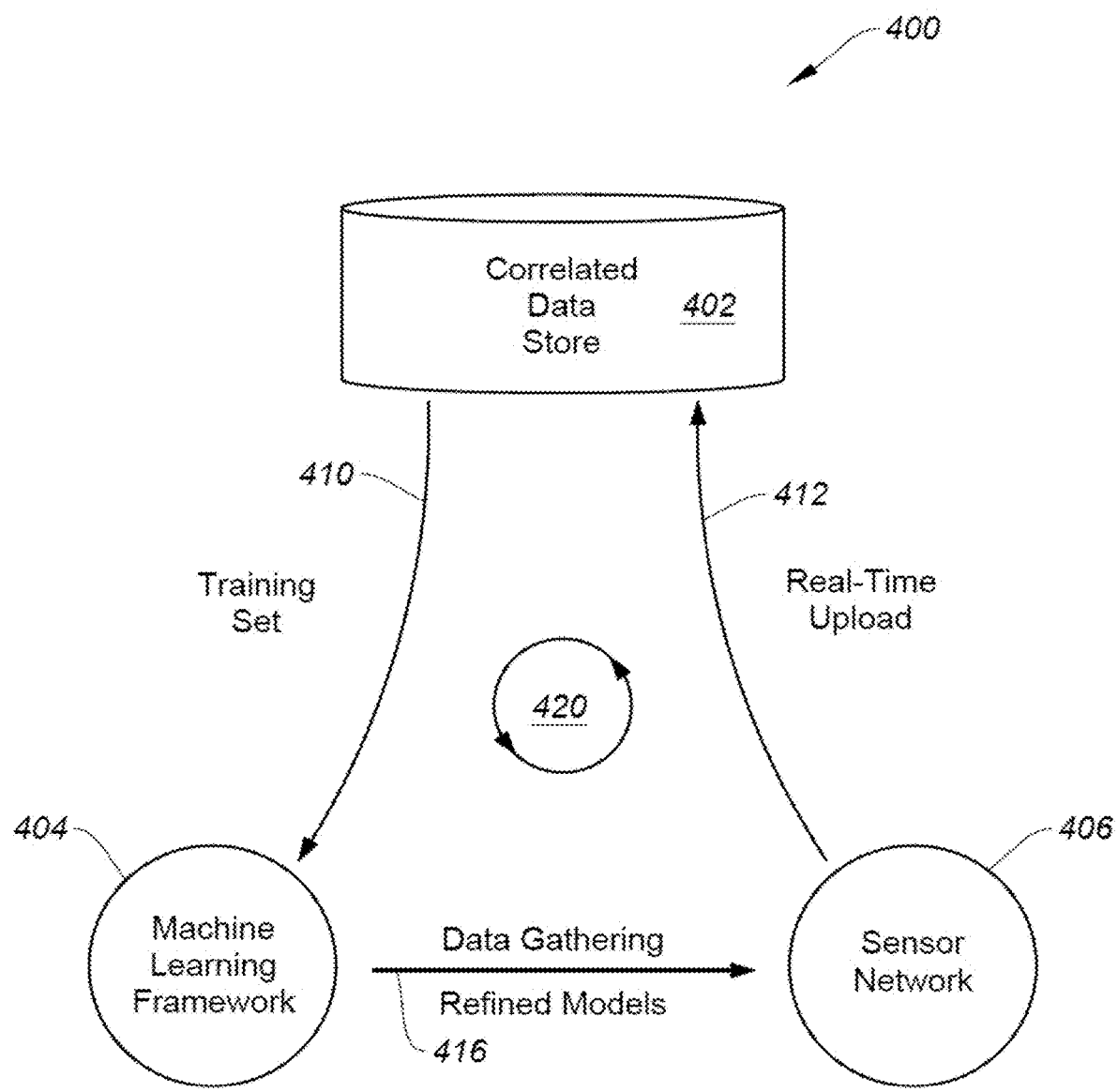
FIG. 4 is a block diagram illustrating an IA model or AIA system using the virtuous cycle in accordance with one embodiment of the present invention.

FIG. 4 is a block diagram 400 illustrating an IA model or AIA system using the virtuous cycle in accordance with one embodiment of the present invention. Diagram 400 includes a correlated data store 402, machine learning framework 404, and sensor network 406. Correlated data store 402, machine learning framework 404, and sensor network 406 are coupled by connections 410-416 to form a virtuous cycle as indicated by numeral 420. It should be noted that the underlying concept of the exemplary embodiment(s) of the present invention would not change if one or more blocks (circuit or elements) were added to or removed from FIG. 4.

In one embodiment, correlated data store 402 manages real-time streams of data in such a way that correlations between the data are preserved. Sensor network 406 represents the collection of vehicles, phones, stationary sensors, and other devices, and is capable of uploading real-time events into correlated data store 402 via a wireless communication network 412 in real-time or in a batched format. In one aspect, stationary sensors include, but not limited to, municipal cameras, webcams in offices and buildings, parking lot cameras, security cameras, and traffic cams capable of collecting real-time images.

The stationary cameras such as municipal cameras and webcams in offices are usually configured to point to streets, buildings, parking lots wherein the images captured by such stationary cameras can be used for accurate labeling. To fuse between motion images captured by vehicles and still images captured by stationary cameras can track object(s) such as car(s) more accurately. Combining or fusing stationary sensors and vehicle sensors can provide both labeling data and historical stationary sampling data also known as stationary "fabric". It should be noted that during the crowdsourcing applications, fusing stationary data (e.g. stationary cameras can collect vehicle speed and position) with real-time moving images can improve ML process.

Machine Learning ("ML") framework 404 manages sensor network 406 and provides mechanisms for analysis and training of ML models. ML framework 404 draws data from correlated data store 402 via a communication network 410 for the purpose of training modes and/or labeled data analysis. ML framework 404 can deploy data gathering modules to gather specific data as well as deploy ML models based on the previously gathered data. The data upload, training, and model deployment cycle can be continuous to enable continuous improvement of models.

Figure 5:
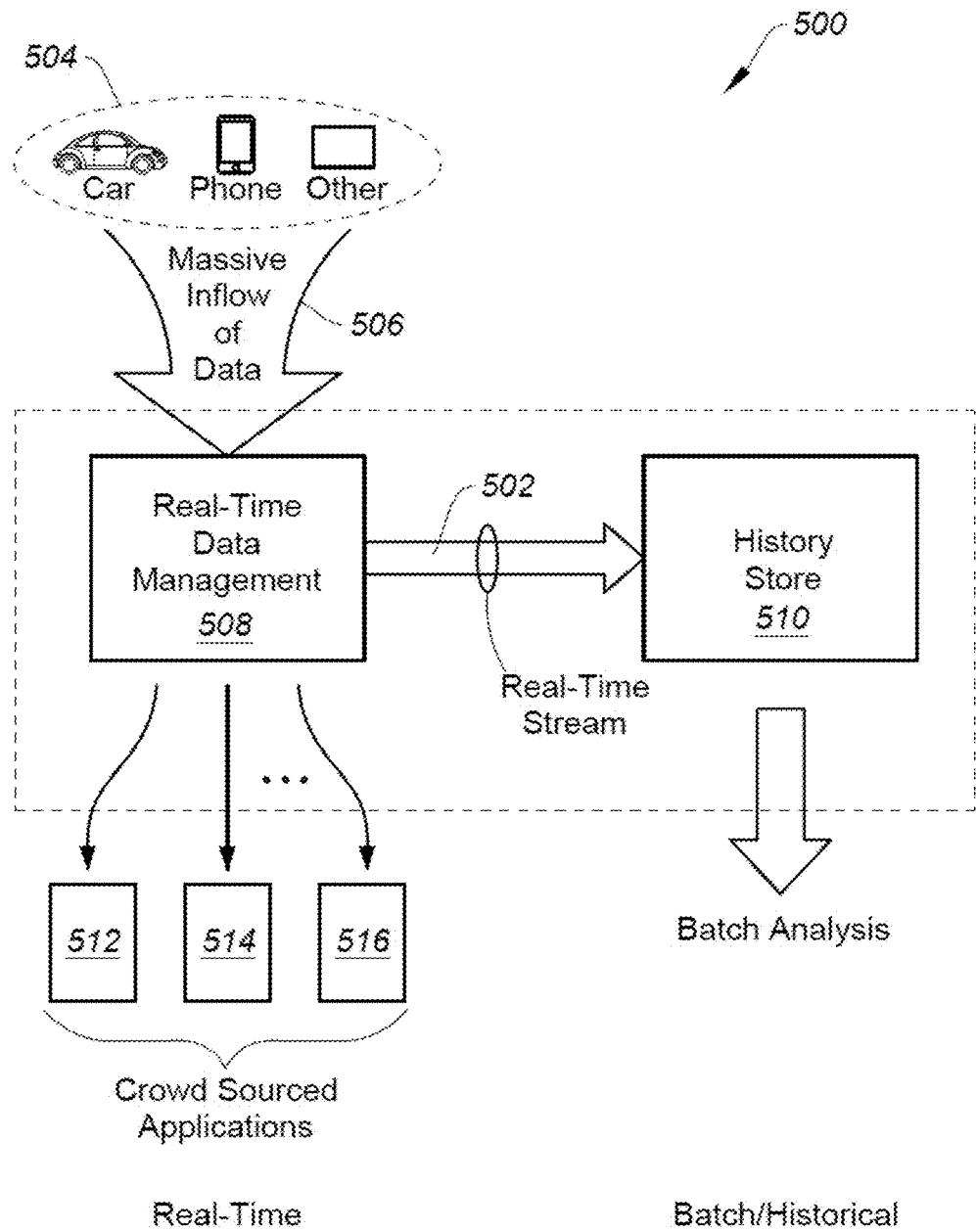
FIG. 5 is a block diagram illustrating an exemplary process of correlating data for AIAS in accordance with one embodiment of the present invention.

FIG. 5 is a block diagram 500 illustrating an exemplary process of correlating data for AIAS in accordance with one embodiment of the present invention. Diagram 500 includes source input 504, real-time data management 508, history store 510, and crowd sourced applications 512-516. In one example, source input 504 includes cars, phones, tablets, watches, computers, and the like capable of collecting massive amount of data or images which will be passed onto real-time data management 508 as indicated by numeral 506. It should be noted that the underlying concept of the exemplary embodiment(s) of the present invention would not change if one or more blocks (or elements) were added to or removed from FIG. 5.

In one aspect, a correlated system includes a real-time portion and a batch/historical portion. The real-time part aims to leverage new data in near or approximately real-time. Real-time component or management 508 is configured to manage a massive amount of influx data 506 coming from cars, phones, and other devices 504. In one aspect, after ingesting data in real-time, real-time data management 508 transmits processed data in bulk to the batch/historical store 510 as well as routes the data to crowd sourced applications 512-516 in real-time.

Crowd sourced applications 512-516, in one embodiment, leverage real-time events to track, analyze, and store information that can be offered to user, clients, and/or subscribers. Batch-Historical side of correlated data store 510 maintains a historical record of potentially all events consumed by the real-time framework. In one example, historical data can be gathered from the real-time stream and it can be stored in a history store 510 that provides high performance, low cost, and durable storage. In one aspect, real-time data management 508 and history store 510 coupled by a connection 502 are configured to perform IA data correlation as indicated by dotted line.

Figure 6:
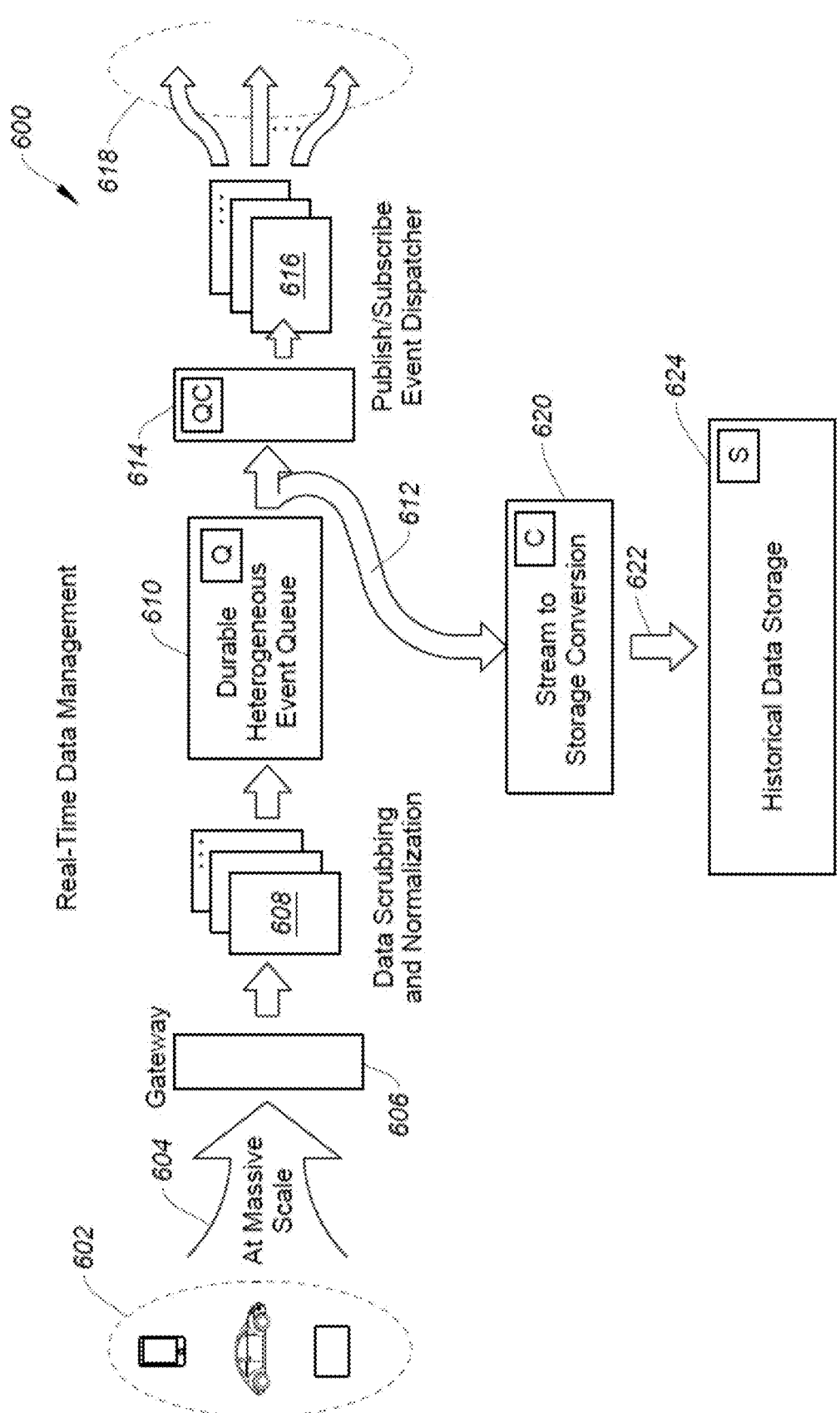
FIG. 6 is a block diagram illustrating an exemplary process of real-time data management for AI model for AIAS in accordance with one embodiment of the present invention.

FIG. 6 is a block diagram illustrating an exemplary process of real-time data management for AI model used for AIAS in accordance with one embodiment of the present invention. Diagram 600 includes data input 602, gateway 606, normalizer 608, queue 610, dispatcher 616, storage conversion 620, and historical data storage 624. The process of real-time data management further includes a component 614 for publish and subscribe. It should be noted that the underlying concept of the exemplary embodiment(s) of the present invention would not change if one or more blocks (circuit or elements) were added to or removed from FIG. 6.

The real-time data management, in one embodiment, is able to handle large numbers (i.e., 10's of millions) of report events to the cloud as indicated by numeral 604. API (application program interface) gateway 606 can handle multiple functions such as client authentication and load balancing of events pushed into the cloud. The real-time data management can leverage standard HTTP protocols. The events are routed to stateless servers for performing data scrubbing and normalization as indicated by numeral 608. The events from multiple sources 602 are aggregated together into a scalable/durable/consistent queue as indicated by numeral 610. An event dispatcher 616 provides a publish/subscribe model for crowd source applications 618 which enables each application to look at a small subset of the event types. The heterogeneous event stream, for example, is captured and converted to files for long-term storage as indicated by numeral 620. Long-term storage 624 provides a scalable and durable repository for historical data.

Figure 7:
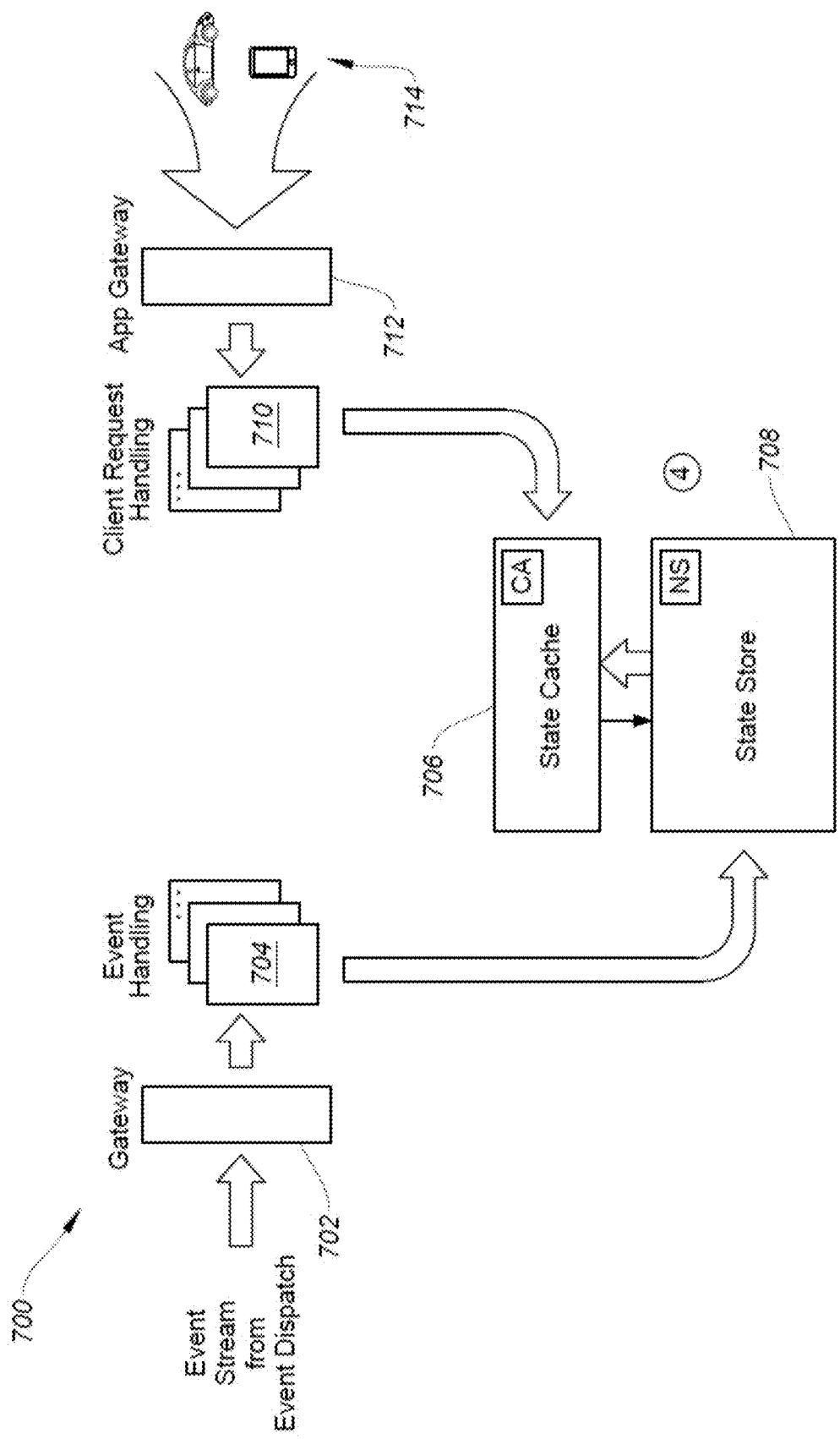
FIG. 7 is a block diagram illustrating a crowd sourced application model for AI model for AIAS in accordance with one embodiment of the present invention.

FIG. 7 is a block diagram 700 illustrating a crowd sourced application model for AI model for AIAS in accordance with one embodiment of the present invention. Diagram 700 includes a gateway 702, event handler 704, state cache 706, state store 708, client request handler 710, gateway 712, and source input 714. In one example, gateway 702 receives an event stream from an event dispatcher and API gateway 712 receives information/data from input source 714. It should be noted that the underlying concept of the exemplary embodiment(s) of the present invention would not change if one or more blocks (or elements) were added to or removed from FIG. 7.

The crowd sourced application model, in one embodiment, facilitates events to be routed to a crowd source application from a real-time data manager. In one example, the events enter gateway 702 using a simple push call. Note that multiple events are handled by one or more servers. The events, in one aspect, are converted into inserts or modifications to a common state store. State store 708 is able to hold data from multiple applications and is scalable and durable. For example, State store 708, besides historical data, is configured to store present data, information about "future data", and/or data that can be shared across applications such as predictive AI (artificial intelligence).

State cache 706, in one example, is used to provide fast access to commonly requested data stored in state store 708. Note that application can be used by clients. API gateway 712 provides authentication and load balancing. Client request handler 710 leverages state store 708 for providing client data.

In an exemplary embodiment, an onboard IA model is able to handle real-time IA detection based on triggering events. For example, after ML models or IA models for IA detection have been deployed to all or most of the vehicles, the deployed ML models will report to collected data indicating IAS for facilitating issuance of real-time warning for dangerous event(s). The information or data relating to the real-time dangerous event(s) or IAS is stored in state store 708. Vehicles 714 looking for IA detection can, for example, access the IAS using gateway 712.

Figure 8:
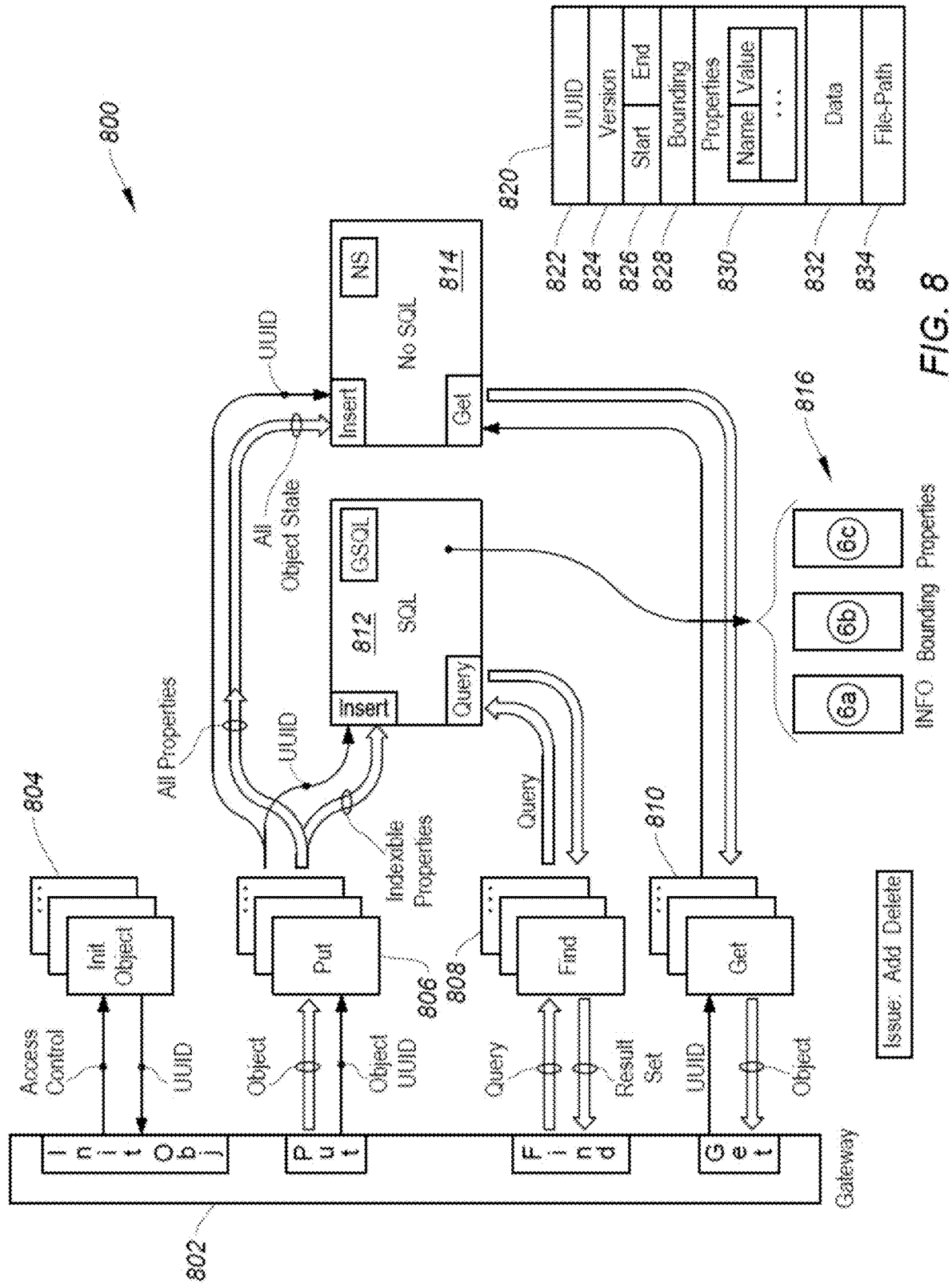
FIG. 8 is a block diagram illustrating a method of storing AI related data using a geo-spatial objective storage for AIAS in accordance with one embodiment of the present invention.

FIG. 8 is a block diagram 800 illustrating a method of storing AI related data using a geo-spatial objective storage for AIAS in accordance with one embodiment of the present invention. Diagram 800 includes gateway 802, initial object 804, put call 806, find call 808, get call 810, SQL (Structured Query Language) 812, non-SQL 814, and geo-spatial object storage 820. It should be noted that the underlying concept of the exemplary embodiment(s) of the present invention would not change if one or more blocks (circuit or elements) were added to or removed from FIG. 8.

Geo-spatial object storage 820, in one aspect, stores or holds objects which may include time period, spatial extent, ancillary information, and optional linked file. In one embodiment, geo-spatial object storage 820 includes UUID (universally unique identifier) 822, version 824, start and end time 826, bounding 828, properties 830, data 832, and file-path 834. For example, while UUID 822 identifies an object, all objects have version(s) 824 that allow schema to change in the future. Start and end time 826 indicates an optional time period with a start time and an end time. An optional bounding geometry 828 is used to specify spatial extent of an object. An optional set of properties 830 is used to specify name-value pairs. Data 832 can be binary data. An optional file path 834 may be used to associate with the object of a file containing relevant information such as MPEG (Moving Picture Experts Group) stream.

In one embodiment, API gateway 802 is used to provide access to the service. Before an object can be added to the store, the object is assigned an UUID which is provided by the initial object call. Once UUID is established for a new object, the put call 804 stores the object state. The state is stored durably in Non-SQL store 814 along with UUID. A portion of UUID is used as hash partition for scale-out. The indexable properties includes version, time duration, bounding, and properties which are inserted in a scalable SQL store 812 for indexing. The Non-SQL store 814 is used to contain the full object state. Non-SQL store 814 is scaled-out using UUID as, for example, a partition key.

SQL store 812 is used to create index tables that can be used to perform queries. SQL store 812 may include three tables 816 containing information, bounding, and properties. For example, information holds a primary key, objects void, creation timestamp, state of object and object properties "version" and "time duration." Bounding holds the bounding geometry from the object and the id of the associated information table entry. Properties hold property name/value pairs from the object stored as one name/value pair per row along with ID of associated info table entry.

Find call 808, in one embodiment, accepts a query and returns a result set, and issues a SQL query to SQL store 812 and returns a result set containing UUID that matches the query.

Figure 9:
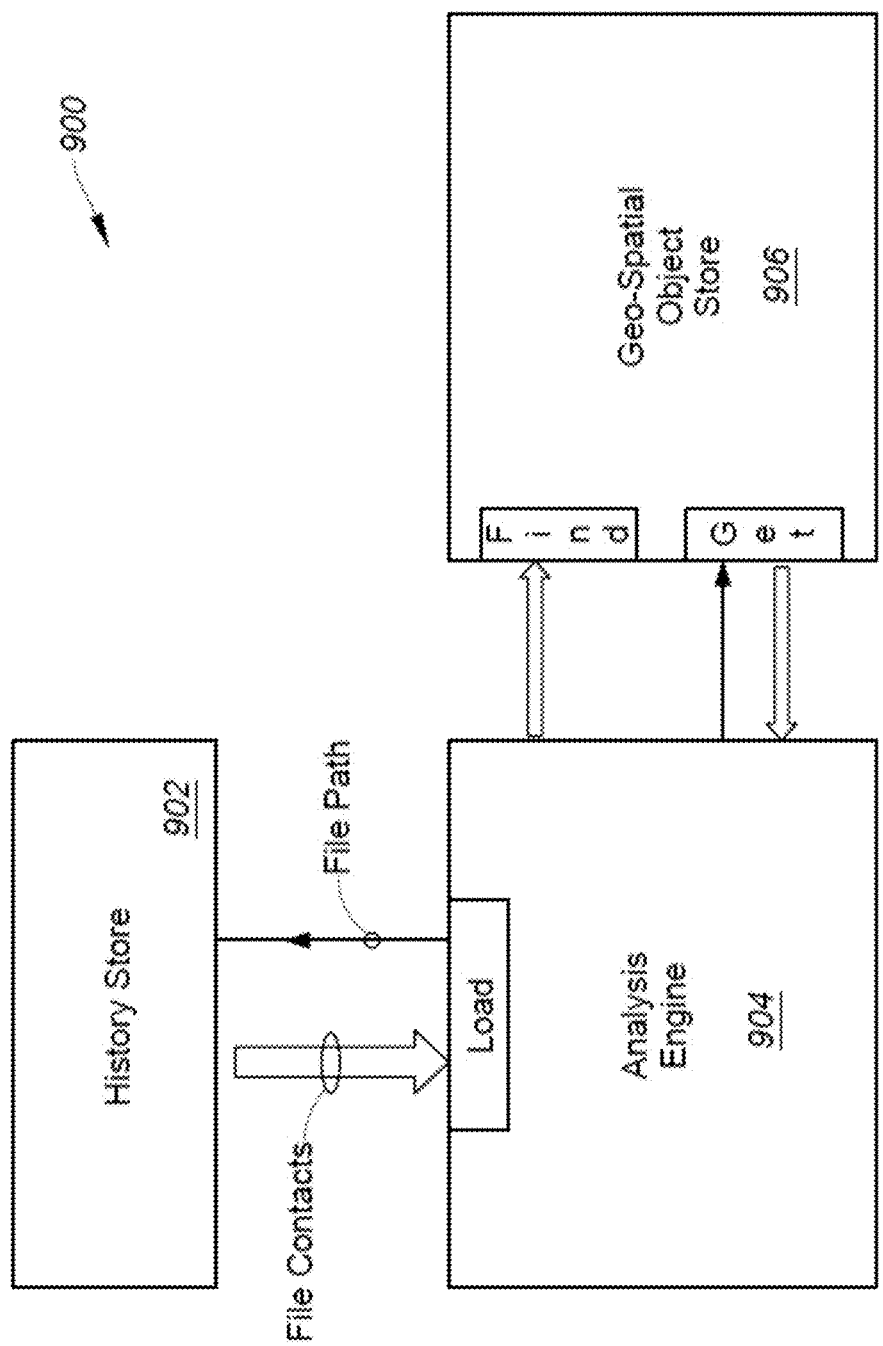
FIG. 9 is a block diagram illustrating an exemplary approach of analysis engine analyzing collected data for AIAS in accordance with one embodiment of the present invention.

FIG. 9 is a block diagram 900 illustrating an exemplary approach of analysis engine analyzing collected data for AIAS in accordance with one embodiment of the present invention. Diagram 900 includes history store 902, analysis engine 904, and geo-spatial object store 906. It should be noted that the underlying concept of the exemplary embodiment(s) of the present invention would not change if one or more blocks (circuit or elements) were added to or removed from FIG. 9.

In one aspect, diagram 900 illustrates analysis engine 904 containing ML training component capable of analyzing labeled data based on real-time captured IA data and historical data. The data transformation engine, in one example, interacts with Geo-spatial object store 906 to locate relevant data and with history store to process the data. Optimally, the transformed data may be stored.

It should be noted that virtuous cycle employing ML training component to provide continuous model training using real-time data as well as historical samples, and deliver IA detection model for one or more subscribers. A feature of virtuous cycle is able to continuous training a model and able to provide a real-time or near real-time result. It should be noted that the virtuous cycle is applicable to various other fields, such as, but not limited to, business intelligence, law enforcement, medical services, military applications, and the like.

Figure 10:
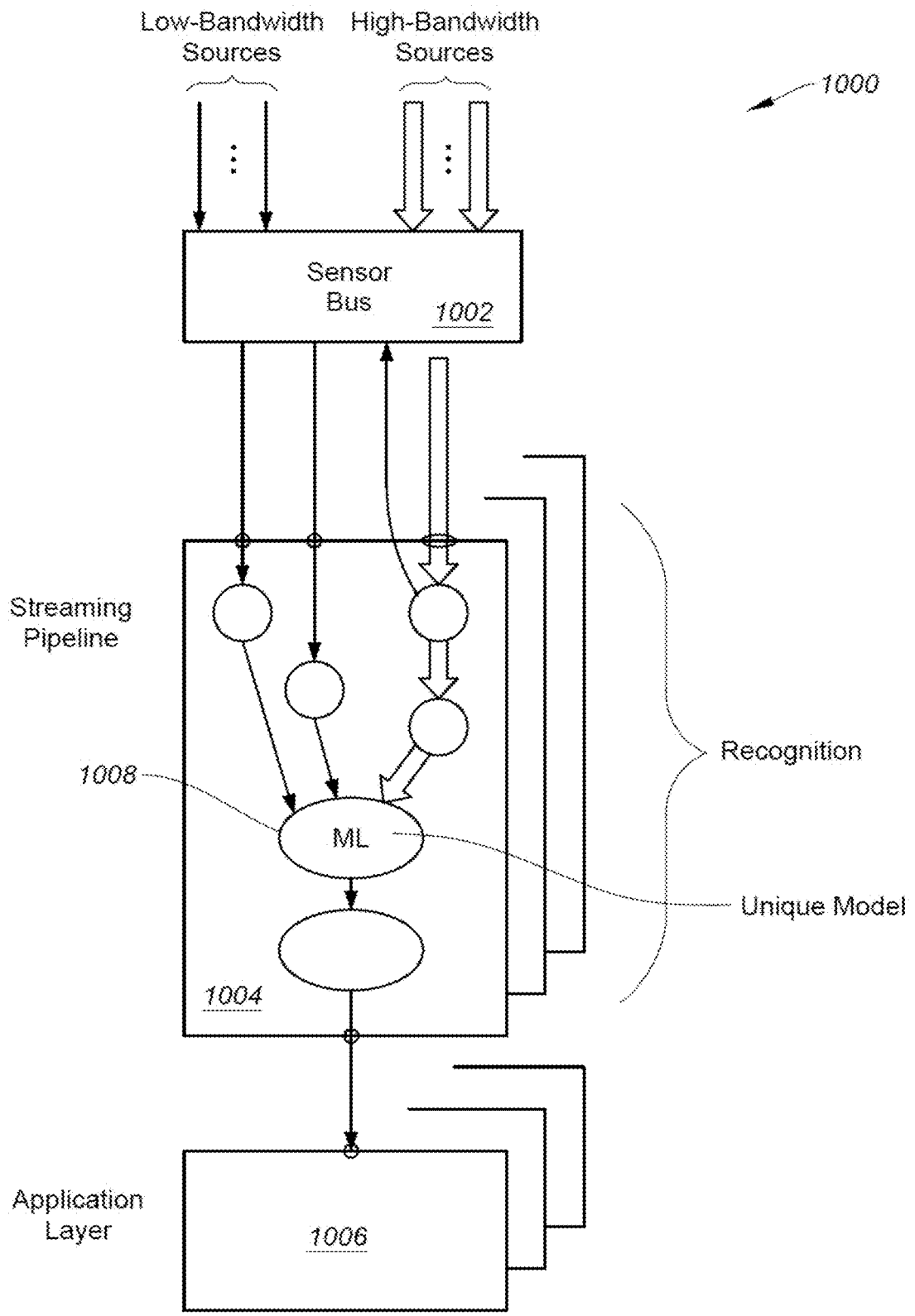
FIG. 10 is a block diagram illustrating an exemplary containerized sensor network used for sensing information for AIAS in accordance with one embodiment of the present invention.

FIG. 10 is a block diagram 1000 illustrating an exemplary containerized sensor network used for sensing information for AIAS in accordance with one embodiment of the present invention. Diagram 1000 includes a sensor bus 1002, streaming pipeline 1004, and application layer 1006 wherein sensor bus 1002 is able to receive low-bandwidth sources and high-bandwidth sources. Streaming pipeline 1004, in one embodiment, includes ML capable of generating unique model such as model 1008. It should be noted that the underlying concept of the exemplary embodiment(s) of the present invention would not change if one or more blocks (circuit or elements) were added to or removed from FIG. 10.

Figure 11:
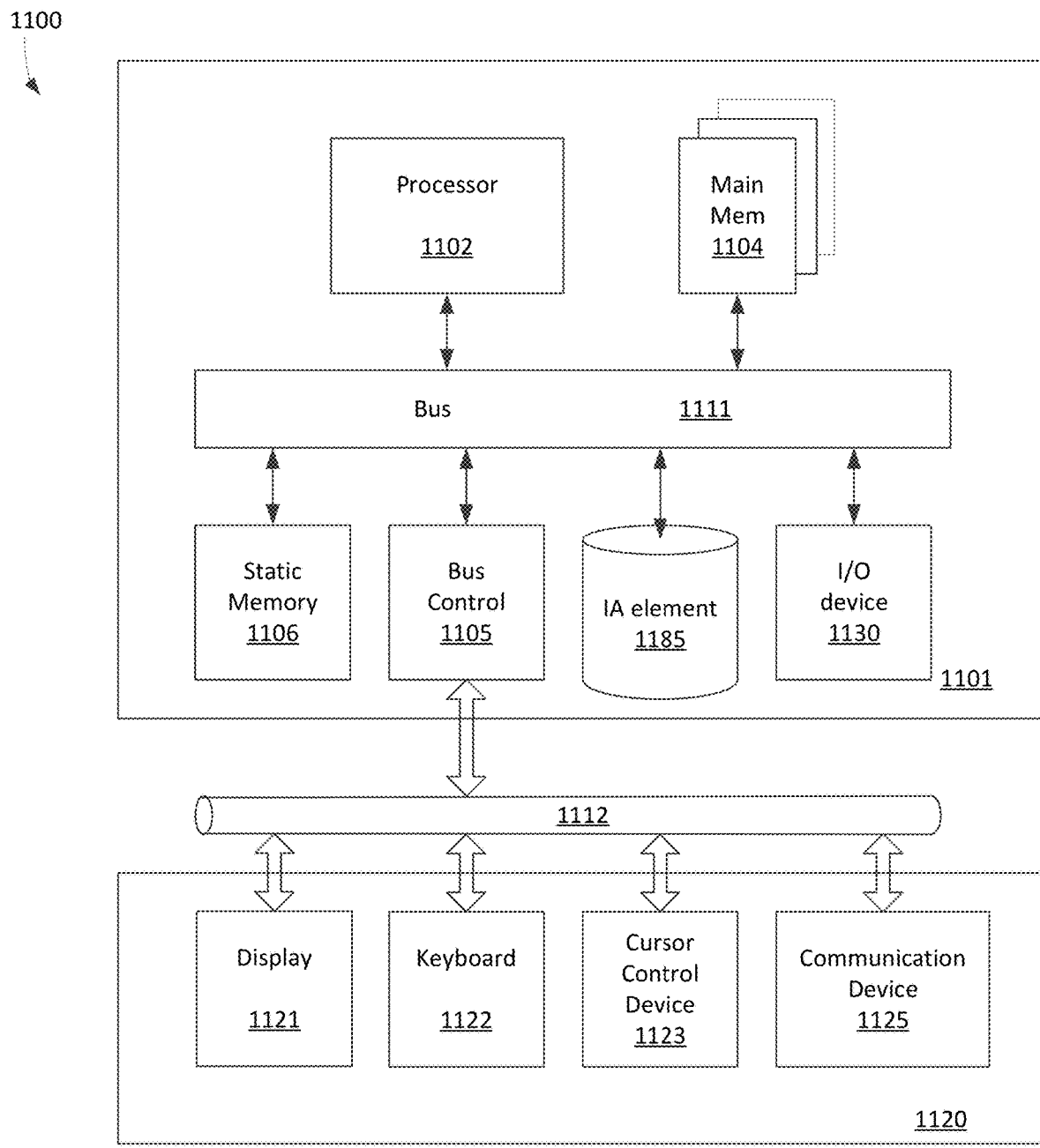
FIG. 11 is a block diagram illustrating a processing device VOC, and/or computer system which can be installed in a vehicle for facilitating the virtuous cycle in accordance with one embodiment of the present invention.

FIG. 11 is a block diagram 1100 illustrating a processing device, VOC, and/or computer(s) which can be installed in a vehicle to support onboard cameras, CAN (Controller Area Network) bus, Inertial Measurement Units, Lidar, et cetera for facilitating virtuous cycle in accordance with one embodiment of the present invention. Computer system or IAS 1100 can include a processing unit 1101, an interface bus 1112, and an input/output ("IO") unit 1120. Processing unit 1101 includes a processor 1102, a main memory 1104, a system bus 1111, a static memory device 1106, a bus control unit 1105, I/O element 1130, and IAS element 1185. It should be noted that the underlying concept of the exemplary embodiment(s) of the present invention would not change if one or more blocks (circuit or elements) were added to or removed from FIG. 11.

Bus 1111 is used to transmit information between various components and processor 1102 for data processing. Processor 1102 may be any of a wide variety of general-purpose processors, embedded processors, or microprocessors such as ARM® embedded processors, Intel® Core™ Duo, Core™ Quad, Xeon®, Pentium™ microprocessor, Motorola™ 68040, AMD® family processors, or Power PC™ microprocessor.

Main memory 1104, which may include multiple levels of cache memories, stores frequently used data and instructions. Main memory 1104 may be RAM (random access memory), MRAM (magnetic RAM), or flash memory. Static memory 1106 may be a ROM (read-only memory), which is coupled to bus 1111, for storing static information and/or instructions. Bus control unit 1105 is coupled to buses 1111-1112 and controls which component, such as main memory 1104 or processor 1102, can use the bus. Bus control unit 1105 manages the communications between bus 1111 and bus 1112.

I/O unit 1120, in one embodiment, includes a display 1121, keyboard 1122, cursor control device 1123, and communication device 1125. Display device 1121 may be a liquid crystal device, cathode ray tube ("CRT"), touch-screen display, or other suitable display device. Display 1121 projects or displays images of a graphical planning board. Keyboard 1122 may be a conventional alphanumeric input device for communicating information between computer system 1100 and computer operator(s). Another type of user input device is cursor control device 1123, such as a conventional mouse, touch mouse, trackball, or other type of cursor for communicating information between system 1100 and user(s).

IA element 1185, in one embodiment, is coupled to bus 1111, and configured to interface with the virtuous cycle for facilitating IA detection(s). For example, if system 1100 is installed in a car, IA element 1185 is used to operate the IA model as well as interface with the cloud based network. If system 1100 is placed at the cloud based network, IA element 1185 can be configured to handle the correlating process for generating labeled data.

Communication device 1125 is coupled to bus 1111 for accessing information from remote computers or servers, such as server 104 or other computers, through wide-area network 102. Communication device 1125 may include a modem or a network interface device, or other similar devices that facilitate communication between computer 1100 and the network. Computer system 1100 may be coupled to a number of servers via a network infrastructure such as the Internet.

The exemplary embodiment of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

Figure 12:
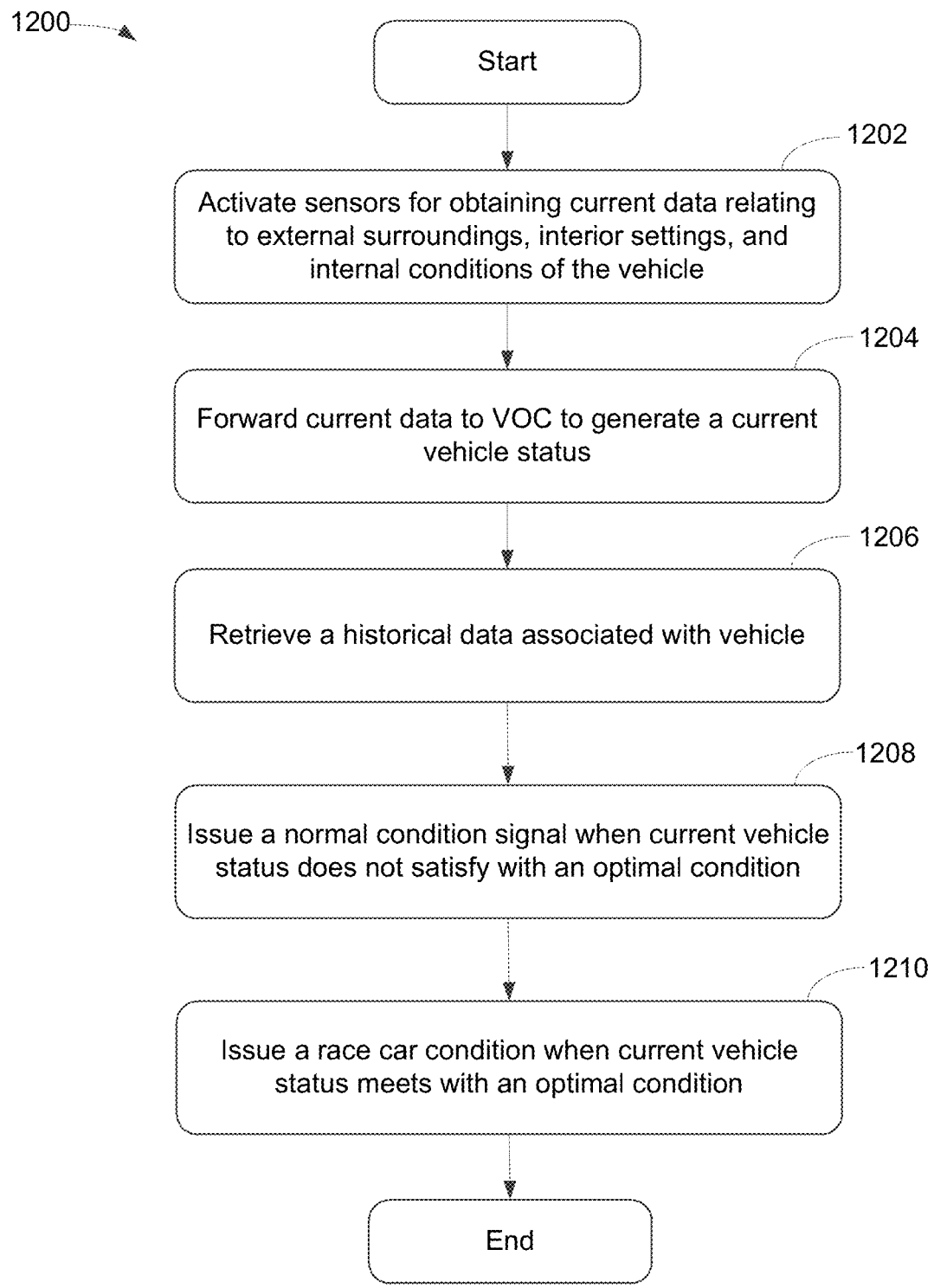
FIG. 12 is a flowchart illustrating a process of AIA system for AIAS capable of providing VMP in accordance with one embodiment of the present invention.

FIG. 12 is a flowchart 1200 illustrating a process of AIAS for providing a report of VMP predicting vehicle status in accordance with one embodiment of the present invention.

At block 1202, a process able to predict an event relating to machinal performance using data obtained from interior and exterior sensors, VOC, and cloud data activates interior and exterior sensors mounted on a vehicle operated by a driver for obtaining current data relating to external surroundings, interior settings, and internal mechanical conditions of the vehicle. For example, after enabling a set of outward facing cameras mounted on the vehicle for recording external surrounding images representing a geographic environment, one or more inward facing cameras mounted in the vehicle is initiated for collecting interior images of the vehicle. Also, a set of internal sensors attached to various mechanical components is activated for measuring temperatures, functionalities, or audio sounds associated with mechanical components within the vehicle. The process, in one embodiment, is capable of detecting driver's response time based on a set of identified road conditions and information from a controller area network ("CAN") bus of the vehicle. The real-time data relating to vehicle performance, road condition, traffic congestion, and weather condition is recorded.

At block 1204, the current data is forwarded to VOC for generating a current vehicle status representing substantially real-time vehicle performance in accordance with the current data.

At block 1206, a historical data associated with the vehicle including mechanical condition is retrieved. Note that the historical data is updated in response to the current data.

At block 1208, a normal condition signal is issued when the current vehicle status does not satisfy with optimal condition based on the historical data. In one aspect, after uploading the current vehicle status to a vehicle performance predictor which resides at least partially at a cloud via a communications network, the big data is obtained from the cloud wherein the big data represents large car samples having similar attributes as the vehicle. For example, the big data accumulates information from cars with similar brands, similar mileages, similar years, similar geographic location, and similar drivers. The current vehicle status is compared with the big data and the historical data to assess whether the vehicle operates in a normal condition.

At block 1210, a race car condition is issued when the current vehicle status meets with the optimal condition based on the historical data. In one example, the current vehicle status is forwarded to a subscriber for evaluating driver's driving skill. The current vehicle status can also be forwarded to a subscriber for assessing normal wearing and tearing. Alternatively, a subscriber schedules a maintenance or repair appointment with the driver based on the current vehicle status. In one embodiment, a manufacture can initiate a recall for automobiles similar to the vehicle at least partially based on the current vehicle status.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method able to predict an event relating to vehicle performance in accordance with information obtained from a plurality of interior and exterior sensors, vehicle onboard computer ("VOC"), and cloud data, the method comprising:

activating at least a portion of a plurality of interior and exterior sensors mounted on a vehicle operated by a driver for obtaining current data relating to external surroundings, interior settings, and internal mechanical conditions of the vehicle;

forwarding the current data to the VOC to generate a current vehicle status representing substantially real-time vehicle performance in accordance with the current data;

retrieving a historical data associated with the vehicle including mechanical condition associated with the vehicle; and issuing a normal condition signal when the current vehicle status does not satisfy with optimal condition based on the historical data.

2. The method of claim 1, further comprising;

uploading the current vehicle status to a vehicle performance predictor at least partially residing at a cloud via a communications network; and obtaining big data from the cloud representing large car samples having similar attributes as the vehicle.

3. The method of claim 2, further comprising comparing the current vehicle status with the big data and the historical data to assess whether the vehicle operates in a normal condition.

4. The method of claim 3, further comprising issuing a race car condition when the current vehicle status meets with the optimal condition based on the historical data.

5. The method of claim 4, further comprising forwarding the current vehicle status to a subscriber for evaluating driver's driving skill.

6. The method of claim 2, wherein obtaining big data from the cloud representing large car samples further includes accumulating information from cars with similar brands, similar mileages, similar years, similar geographic location, and similar drivers.

7. The method of claim 1, further comprising forwarding the current vehicle status to a subscriber for assessing normal wearing and tearing.

8. The method of claim 7, further comprising scheduling a maintenance appointment with the driver based on the current vehicle status.

9. The method of claim 7, further comprising initiating a manufacture recall for automobiles similar to the vehicle at least partially based on the current vehicle status.

10. The method of claim 1, further comprising updating the historical data in response to the current data.

11. The method of claim 1, wherein activating at least a portion of a plurality of interior and exterior sensors includes:

enabling a set of outward facing cameras mounted on the vehicle for recording external surrounding images representing a geographic environment in which the vehicle operates; and initiating one or more inward facing cameras mounted in the vehicle for collecting interior images of the vehicle.

12. The method of claim 1, wherein activating at least a portion of a plurality of interior and exterior sensors includes activating a set of internal sensors attached to various mechanical components for measuring at least one of temperatures, functionalities, and audio sounds associated with mechanical components within the vehicle.

13. The method of claim 1, wherein activating at least a portion of the plurality of interior and exterior sensors includes detecting driver's response time based on a set of identified road conditions and information from a controller area network ("CAN") bus of the vehicle.

14. The method of claim 1, wherein activating at least a portion of the plurality of interior and exterior sensors includes recording real-time data relating to vehicle performance, road condition, traffic congestion, and weather condition.

\* \* \* \* \*